(12) United States Patent
Pavlidis

(10) Patent No.: US 7,076,088 B2
(45) Date of Patent: Jul. 11, 2006

(54) NEAR-INFRARED DISGUISE DETECTION

(75) Inventor: Ioannis Pavlidis, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 599 days.

(21) Appl. No.: 09/732,236

(22) Filed: Dec. 7, 2000

(65) Prior Publication Data

US 2002/0044674 A1 Apr. 18, 2002

Related U.S. Application Data

(63) Continuation-in-part of application No. 09/389,925, filed on Sep. 3, 1999, now Pat. No. 6,370,260.
(60) Provisional application No. 60/210,280, filed on Jun. 8, 2000.

(51) Int. Cl.
*G06K 9/00* (2006.01)

(52) U.S. Cl. .................. 382/118; 348/164; 348/169
(58) Field of Classification Search .............. 382/103, 382/107, 115, 118, 218, 209, 210, 211, 212, 382/275; 348/169, 584, 33, 77, 78, 164, 267, 348/666; 250/339, 339.1, 316.1, 330, 338.1, 250/339.11, 339.14, 342, 495.1; 356/51, 356/388, 448; 340/5.53, 5.83; 351/204
See application file for complete search history.

(56) References Cited

U.S. PATENT DOCUMENTS 4,057,352 A 11/1977 Babb
4,500,784 A * 2/1985 Hacskaylo ............. 250/339.11
4,520,504 A 5/1985 Walker et al.

(Continued)

FOREIGN PATENT DOCUMENTS

EP 0 990 416 A1 4/2000
WO 97/21188 6/1997
WO 01/95247 12/2001

OTHER PUBLICATIONS

Francine J. Prokoski: "Disguise Detection and identification using infrared imagery" (XP–001028502).*
Pavlidis et al: "A Near–Infrared Fusion Scheme for Automatic Detection of Vehicle Passengers" (XP–001028284).*
Fendt et al., "The neuroanatomical and neurochemical basis of conditioned fear," *Neurosci Biobehav Rev*, 23(5):743–60 (May, 1999).
Jacquez et al., "The spectral reflectance of human skin in the region 0.7–2.6 μm," *Technical Report, 189*, Army Medical Research Laboratory, Fort Knox (Apr., 1955).
Jordan et al., "Hierarchical Mixtures of Experts and the EM Algorithm," *Neural Computation, 6*, pp. 181–214 (1994).
Levin et al., "The energy expended in chewing gum," *New England Journal of Medicine*, 341(27):2100 (Dec., 1999).
Mendez, *The Master of Disguise*, William Morrow and Co., New York, N.Y.; cover page, title page, copyright page and table of contents only; 4 pgs. (1999).
Moghaddam et al., "Probabilistic Visual Learning for Object Recognition," *IEEE Trans. Pattern Analysis and Machine Intelligence*, 19(7):696–710 (Jul., 1997).

(Continued)

*Primary Examiner*—Kanjibhai Patel
*Assistant Examiner*—Abolfazl Tabatabai
(74) *Attorney, Agent, or Firm*—Kris T. Fredrick

(57) ABSTRACT

Detection of a person disguised with one or more artificial materials includes detecting reflection from at least one portion of a head of a human body in at least a portion of an upper band of the near infrared spectrum. The presence of an artificial material associated with the head of the human body is determined based on the detected reflection.

37 Claims, 12 Drawing Sheets

U.S. PATENT DOCUMENTS

| | | | | |
|---|---|---|---|---|
| 4,733,081 | A | | 3/1988 | Mizukami |
| 5,013,917 | A | | 5/1991 | Ulich |
| 5,180,907 | A | * | 1/1993 | Udden et al. ............... 250/205 |
| 5,221,919 | A | | 6/1993 | Hermans |
| 5,293,427 | A | | 3/1994 | Ueno et al. |
| 5,703,367 | A | | 12/1997 | Hashimoto et al. |
| 5,792,050 | A | * | 8/1998 | Alam et al. ................. 600/310 |
| 5,801,763 | A | | 9/1998 | Suzuki |
| 5,859,921 | A | | 1/1999 | Suzuki ....................... 382/118 |
| 5,866,887 | A | * | 2/1999 | Hashimoto et al. ....... 235/98 R |
| 5,870,138 | A | | 2/1999 | Smith et al. ................ 348/143 |
| 5,878,156 | A | | 3/1999 | Okumura .................... 382/118 |
| 5,900,942 | A | | 5/1999 | Spiering |
| 5,940,139 | A | * | 8/1999 | Smoot ........................ 348/584 |
| 6,002,505 | A | | 12/1999 | Kraenert et al. |
| 6,121,953 | A | | 9/2000 | Walker ....................... 345/156 |
| 6,178,259 | B1 | | 1/2001 | Harris |
| 6,353,764 | B1 | * | 3/2002 | Imagawa et al. .............. 700/1 |
| 6,370,260 | B1 | | 4/2002 | Pavlidis et al. |
| 6,498,564 | B1 | * | 12/2002 | Oda ........................... 340/567 |
| 6,717,518 | B1 | | 4/2004 | Prim et al. .................. 340/576 |
| 2002/0136435 | A1 | | 9/2002 | Prokoski ..................... 382/118 |

OTHER PUBLICATIONS

Otsu, "A Threshold Selection Method from Gray–Level Histograms," *IEEE Trans. Systems, Man And Cybernetics* 9:(1)62–65 (Jan., 1979).

Pavlidis et al., "Automatic passenger counting in the high occupancy vehicle (HOV) lanes" *Proceedings 1999 Annual Meeting of the Intelligent Transportation Society of America,* Washington, D.C. (Apr. 19–22, 1999).

Pavlidis et al., "A near–infrared fusion scheme for automatic detection of vehicle passengers," *Proceedings 1999 IEEE Workshop on Computer Vision Beyond the Visible Spectrum: Methods and Applications,* 41–48, Fort Collins, C.O. (Jun. 22, 1999).

Penev et al., "Local feature analysis: a general statistical theory for object representation," *Network: Computation in Neural Systems,* 7(3):477–500 (Aug., 1996).

Pentland et al., "Face recognition for smart environments," *IEEE Computer, 33*(2):50–55 (Feb., 2000).

Phillips et al., "The FERET database and evaluation procedure for face–recognition algorithms," *Image and Vision Computing,* 16(5):295–306 (Apr., 1998).

Prokoski "Disguise detection and identification using infrared imagery," *Procedings of SPIE, Optics, and Images in Law Enforcement II, 339:*27–31, A.S. Hecht, ed., Arlington, V.A. (May, 1982).

Sabins, *Remote Sensing, Principles and Interpretation,* W.H. Freeman and Company, New York, N.Y.; cover page, title page, copyright page and table of contents only; 7 pgs. (1997, 3rd ed.).

Sliney, "Laser and LED eye hazards: safety standards," *Optics and Photonics News,* pp 32–(Sep., 1997).

Visionics Corporation, "Face detection constantly searches for faces in a datastream" Jersey City, N.J.; retrieved from the Internet on Jun. 25, 2001, <URL:http://www.visionics.com/faceit/tech/detect.html>, 1 pg.

Wiskott et al., "Face recognition by elastic bunch graph matching," *IEEE Trans. Pattern Analysis and Machine Intelligence,* 19(7):775–779 (Jul., 1997).

Zhu et al., "Region Competition: Unifying Snakes, Region Growing, and Bayes/MDL for Multiband Image Sementation, IEEE Transactions on Image Analysis and Machine Intelligence," 18(9):884–900 (Sep., 1996).

Prokoski Francine J: "Disguise Detection and Identification Using Infrared Imagery" Optics and Images in Law Enforcement 2.; Alington, VA, USA, vol. 339, 1983, pp. 27–31, XP001028502 Proceedings of SPIE—The International Society for Optical Engineering 1983 SPIE, Bellingham, WA, USA, p. 29 Section "Disguise Effects", p. 31, Line 1—Line 10.

Prokoski F J et al; "Identification of Individuals by Means of Facial Thermograph" Proceedings of the International Carnahan Conference on Security Technology: Crime Countermeasures. Atlanta, Oct. 14–16, 1992, New York, IEEE, US Oct. 14, 1992 pp. 120–125, XP000357473, p. 121, Right- –Hand Column, Line 4—p. 122. Left–Hand Column, Last Paragraph; Table 2.

Pavlidis I et al: "A Near–Infrared Fusion Scheme for Automatic Detection of Vehicle Passengers" Proceedings IEEE Workshop on Computer Vision Beyond the Visible Spectrum: Methods and Applications (CVBVS'99), Proceedings of IEEE Workshop on Computer Vision; Beyond the Visible Spectrum—Methods and Applications. Fort Collins. Co., USA, Jun. 21–22, pp. 41–48, XP001028284 1999, Los Alamitos, CA, USA, IEEE Comput. Soc, USA, ISBN: 0–7695–0050–1 Abstract.

Ballard, "Generalizing the Hough Transform to Detect Arbitrary Shapes, "Pattern Recognition, vol. 13, No. 2, pp. 111–122, 1981.

Huang et al., "Face Detection and Precise Eyes Location," in *Proceedings 15th International Conference on Pattern Recognition,* 2000, vol. 4, pp. 722–727.

Jeon et al., "Rotation Invariant Face Detection Using a Model–Based Clustering Algorithm," in Proceedinsg 2000 IEEE International Conference on Multimedia and Expo, 2000, vol. 2, pp. 1149–1152.

Kawato et al., "Two Step Approach for Real–Time Eye Tracking with a New Filtering Technique," in Proceedings 2000 IEEE International Conference on Systems, Man, and Cybernetics, 2000, vol. 2, pp. 1366–1371.

Kim et al., "Face Detection Using Multi–Modal Information" in Proceedings Fourth IEEE International Conference on Automatic Face and Gesture Recognition, 2000, pp. 14–19.

Li et al., "Multi–View Face Detection Using Support Vector Machines and Eigenspace Modeling," in Proceedings Fourth International Conference on Knowledge–Based Intelligent Engineering Systems, & Allied Technologies, 2000, vol. 1, pp. 241–244.

Lv et al., "A Novel Algorithm for Rotated Human Face Detection" in Proceedings IEEE Conference on Computer Vision and Pattern Recognition, 2000, vol. 1, pp. 760–765.

Morimoto et al., "Real–Time Multiple Face Detection Using Active Illumination," in Proceedings Fourth IEEE International Conference on Automatic Face and Gesture Recognition, 2000. pp. 8–13.

Pavlidis et al., "A Vehicle Occupant Counting System Based on Near Infrared Phenomenology and Fuzzy Neural Classification," IEEE Transactions on Intelligent Transportation Systems, vol. 1, No. 2, pp. 72–85, Jun. 2000.

Pavlidis et al., "The Imaging Issue in an Automatic Face/ Disguise Detection System," in Proceedings IEEE Workshop on Computer Vision beyond the Visible Spectrum: Methods and Applications, 2000. pp. 15–24.

Rowley et al., "Neural Network–Based Face Detection," IEEE Transactions on Pattern Analysis and Machine Intelligence, vol. 20, No. 1 pp. 23–38, Jan. 1998.

Wilder et al., "Comparison of Visible and Infra–Red Imagery for Face Recognition," Proceedings Second IEEE International Conference on Automatic Face and Gesture Recognition, 1996, pp. 182–187.

Zhu, et al., "Fast Face Detection Using Subspace Discriminant Wavelet Features," in Proceedings IEEE Conference on Computer Vision and Pattern Recognition, 2000, vol. 1, pp. 636–641.

* cited by examiner

NEAR-INFRARED DISGUISE DETECTION

REFERENCE TO RELATED APPLICATIONS

This application is a continuation in part of U.S. patent application Ser. No. 09/389,925 filed Sep. 3, 1999 now U.S. Pat. No. 6,370,260 and claims the benefit of U.S. Provisional Application No. 60/210,280, filed Jun. 8, 2000, wherein such documents are incorporated herein by reference.

BACKGROUND OF THE INVENTION

The present invention pertains to detection systems and methods. More particularly, the present invention pertains to detection systems and methods using the near-infrared spectrum for the detection of, for example, disguised persons.

In certain situations, disguise detection is of paramount importance. For example, in high-end security applications, e.g., surveillance of an embassy perimeter where there is a need to know if disguised terrorists are staking out a facility, disguise detection is required. Sophisticated systems for early detection and identification of individuals at a distance need to be developed and implemented for future security systems.

Sophisticated terrorists use both natural (e.g., darkness, weather, blending into the background) and man-made (e.g., heavy make-up, artificial face parts, add-on hair, etc.) deception and disguise techniques to avoid identification. Currently, systems that can determine whether an individual is wearing a facial disguise are lacking. Therefore, face identification processes and systems that have the capability to identify a particular human face cannot even be initiated, or even if such processes are initiated, the processes do not know of the possible disguise being used by the individual. Therefore, the face identification processes are easily rendered ineffective. As such, the mere detection of a disguised individual on the perimeter is highly valuable to security forces.

One article entitled "Disguise detection and identification using infrared imagery," by F. J. Prokoski, *Proceedings of SPIE, Optics, and Images in Law Enforcement II*, A. S. Hecht, Ed., Arlington, pp. 27–31, Virginia, May 1982, describes a disguise detection system that uses facial thermograms in the thermal infrared spectrum for the detection of disguises and in positive identification of known individuals. However, thermal infrared radiation does not transmit effectively through glass, e.g., so as to allow for detection of disguises within vehicles.

Other portions of the spectrum are also ineffective for use in disguise detection. For example, even though the visible spectrum has been used in imaging and detecting individuals, such visible spectrum systems or methods are not effective for disguise detection. Disguises cannot be detected in the visible band because by definition such disguises are meant to cheat the human eye and the other sensors that operate in the same wavelength. In other words, in the visible spectrum, artificial materials disguising an individual are not detectable.

Further, for example, the lower portion of the electromagnetic spectrum consists of gamma rays, x-rays, and radiation in the ultra-violet range. Radiation of such wavelengths is harmful. Thus, such radiation that is typically useful in a controlled manner, e.g., for medical applications, cannot generally be used for disguise detection.

At the far end of the electromagnetic spectrum, there is microwave and radio radiation. This range of the spectrum has recently started to be exploited for imaging purposes. Sensors operate in an active or in passive mode. The major advantage of such longer wavelengths is that they can penetrate clouds, fog, and rain for producing weather independent imaging results. However, the technology for such wavelengths is new and prohibitively expensive. Also, the sensors available for detection in this range of radiation are extremely large and have very low resolution.

Related efforts by others, for example, in the field of detecting occupants in vehicles, such as for gathering statistics in high occupancy vehicle lanes which can be used for road construction planning, have involved the use of a near-infrared camera (i.e., in the range of 0.55 to 0.90 micron) and a near-infrared illumination source in the same range of wavelengths. One reason for using near-infrared sensing is the ability to use non-distracting illumination at night. Illumination at nighttime enhances the quality of the image. However, it appears that this choice of range of wavelengths is not appropriate because of its close proximity to the visible spectrum. Experiments have shown that the human eye has some sensitivity to this range of near-infrared wavelengths, however small. Another reason for this approach, was to bypass problems caused by solar illumination during daytime, such as glare from glass of vehicles. Nevertheless, particularly in this range of the spectrum (i.e., 0.55 to 0.9 micron) solar illumination is still substantial and the associated glare can be reduced only through the use of polarizing filters.

Further, in more general terms, related art projects that involve imaging usually adopt the use of visible spectrum cameras which as described above, are ineffective in disguise detection. One strong point of the visible spectrum is that the relevant imaging sensors are very advanced and at the same time very economical. Visible spectrum cameras have a particular advantage in terms of speed, which is an important consideration, for example, in detecting occupants in vehicles, where vehicles are moving at rates of speed of 65 mph. These cameras can also have very high resolution, resulting in very clear images under various conditions. However, unfortunately, in addition to not detecting disguised individuals, there are other serious problems with the visible spectrum approach. For instance, some vehicles have heavily tinted window glass to reduce glare from solar illumination. This glass is nearly opaque to visible spectrum cameras. Also, visible spectrum cameras do not have operational capability during nighttime.

Visible spectrum or very near infrared detection of people in vehicles has not been very successful under most conditions. The glare and other problems caused by solar illumination, such as through vehicle windows, has prevented effective detection of vehicle occupants. Also, environmental conditions like weather obscure detection. People appear to have darker or lighter faces, depending on the characteristics of the people being detected, and on the incident angle and intensity of deliberate or incidental illumination.

SUMMARY OF THE INVENTION

Various embodiments of the present invention provide solutions to one or more problems existing with respect to detection systems and methods, and in particular disguise detection systems and methods. Such embodiments may provide one or more of the following advantages. For example, disguised faces may be detected within vehicles through window glass thereof. Further, the present invention provides a simple thresholding system that can deliver excellent disguise detection results. In addition, the existence of specific materials used for disguise purposes may be identified.

The present invention capitalizes on the unique and universal properties of the natural human skin and/or natural human hair in the upper band of the near-infrared spectrum. Some embodiments of the methods according to the present invention include one or more of the following: detecting reflection from at least one portion of a head of a human body in at least a portion of an upper band of the near-infrared spectrum (e.g., at least a portion within the range of 1.4 µm and greater in the upper band of the near-infrared spectrum); determining the presence of an artificial material associated with the head of the human body based on the detected reflection; detecting reflection from at least a skin portion of the head of the human body; detecting reflection from at least a hair portion of the head of the human body; determining the presence of an artificial material associated with the head of the human body by displaying to a user a representation of the detected reflection; determining the presence of an artificial material associated with the head by generating data representative of the detected reflection and comparing the data to at least one threshold reference reflection level; identifying one or more artificial materials associated with the head; basing the threshold reference reflection level(s) on a level of reflection of natural skin of the human body, the level of reflection of natural hair of the human body, or the level of reflection of one or more artificial materials; using an illumination source matched to the upper band of the near-infrared spectrum detected to illuminate the head of the human body; controlling the illumination source based on a detected illumination level to maintain the desired illumination level on the head of the human body.

Some embodiments of a disguised person detection system include one or more of the following features: a detector apparatus operable to detect reflection from at least a portion of the head of the human body in at least a portion of an upper band of the near-infrared spectrum; an indication apparatus operable to provide a user with information as to the presence of an artificial material associated with the head of the human body based on the detected reflection (e.g., wherein the indication apparatus comprises a display operable to provide a representation of the detected reflection and/or wherein the indication apparatus may comprise circuitry operable to compare information representative of the deflected reflection to one or more threshold reference reflection levels, wherein the threshold reference reflection levels may be based on a level of reflection of one or more artificial materials, the natural skin of the human body, the natural hair of the human body, etc.); an illumination source matched to the at least a portion of the upper band of the near-infrared spectrum and positioned to illuminate at least a portion of the head of the human body; a detector operable to detect an illumination level proximate the head so as to provide information to circuitry operable to control the illumination source based on the detected illumination level such that a desired illumination level can be maintained.

Further, in other embodiments of the present invention, a detection method may include detecting reflection from a scene in at least a portion of at least one band of the near-infrared spectrum, and thereafter, determining the presence of a head of the human body in the scene. The features of the disguise detection methods and/or system described above may then be used to determine the presence of an artificial material associated with the detected head.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

BRIEF DESCRIPTION OF THE EMBODIMENTS

Figure 5:
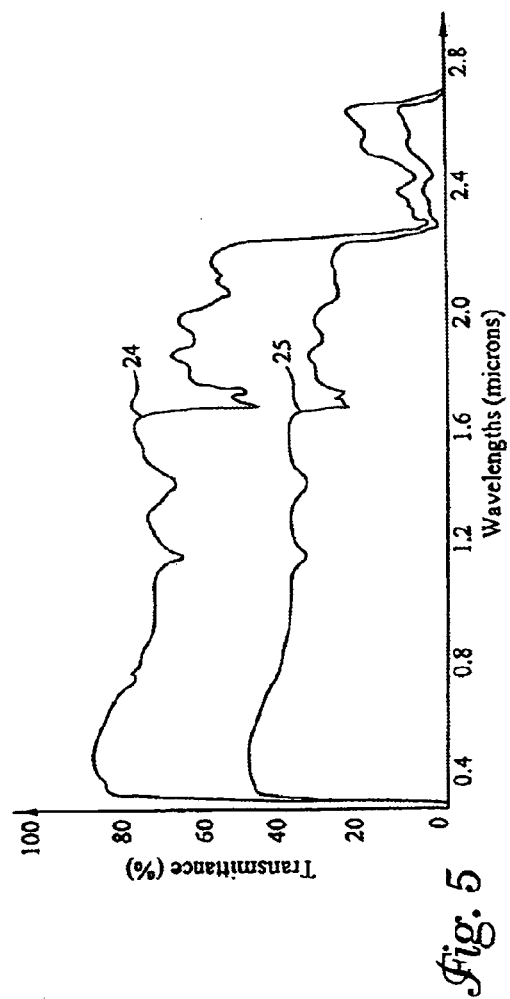

FIG. 5 reveals the infrared transmittance characteristics for an automobile windshield.

Figure 6:
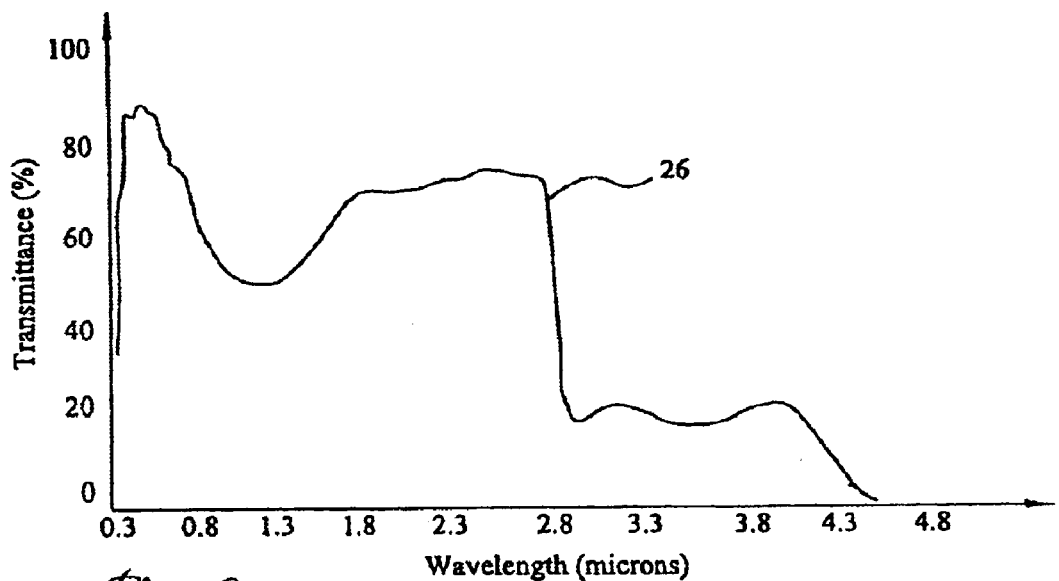

FIG. 6 reveals the infrared transmittance characteristics for an automobile side window.

Figure 7:
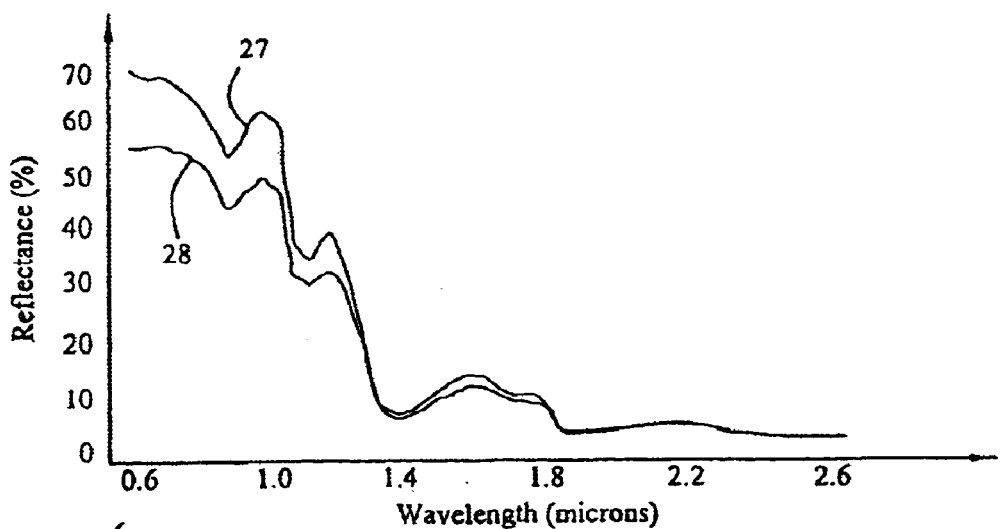

FIG. 7 is a graph showing the percentage of reflectance for Caucasian males of light and dark complexions.

Figure 8:
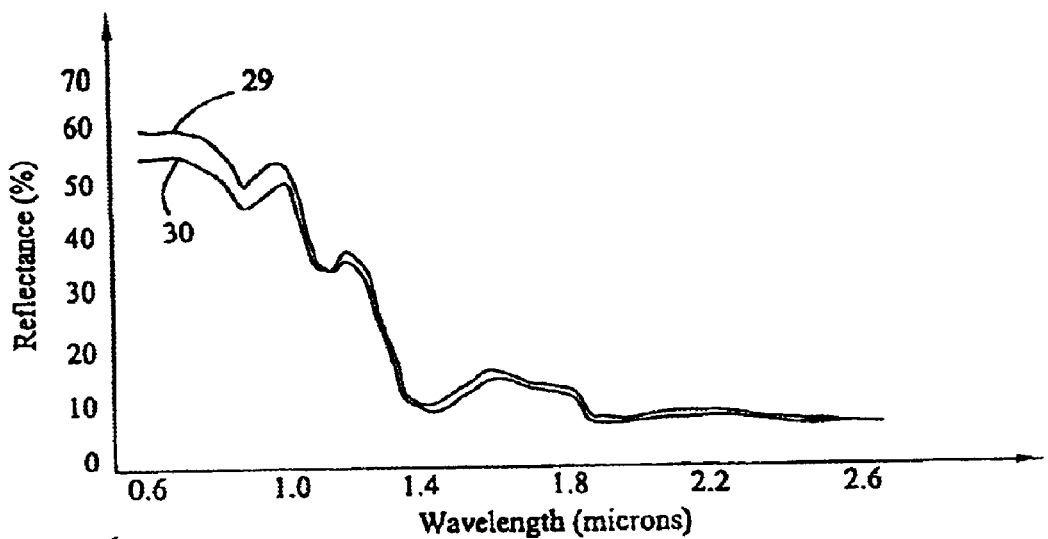

FIG. 8 is a graph showing the percentage of reflectance for Asian males of light and dark complexions.

Figure 9:
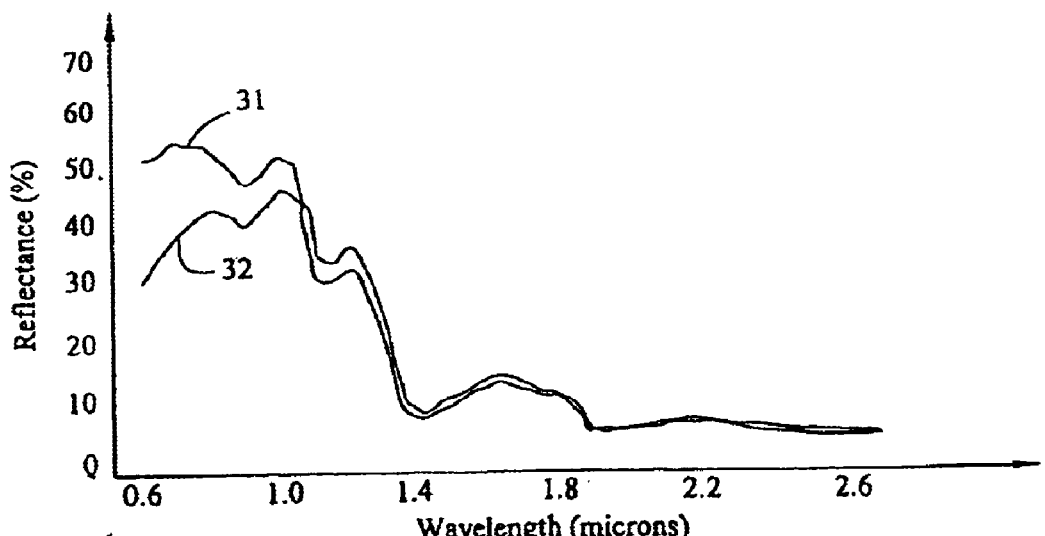

FIG. 9 is a graph showing the percentage of reflectance for black males of light and dark complexions.

Figure 10:
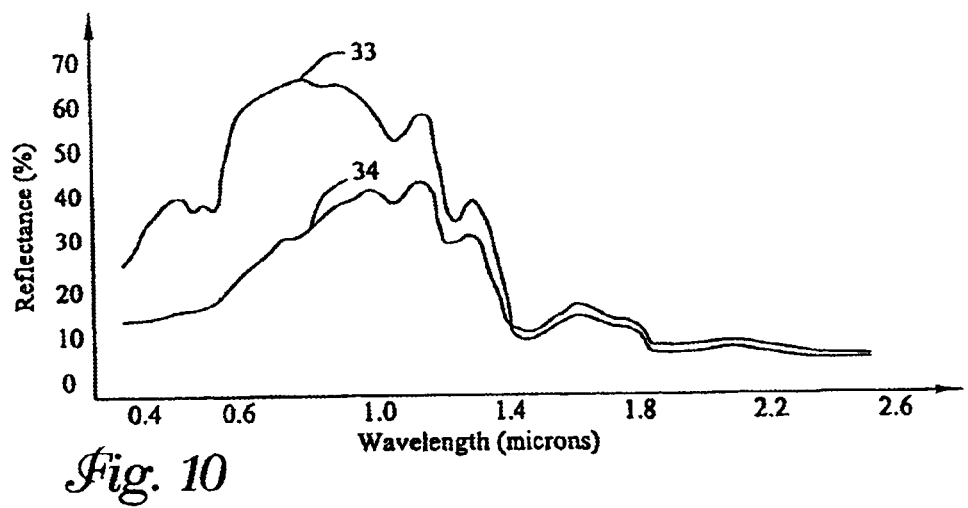

FIG. 10 is a graph showing a comparison of reflectance for light and dark skin.

Figure 11:
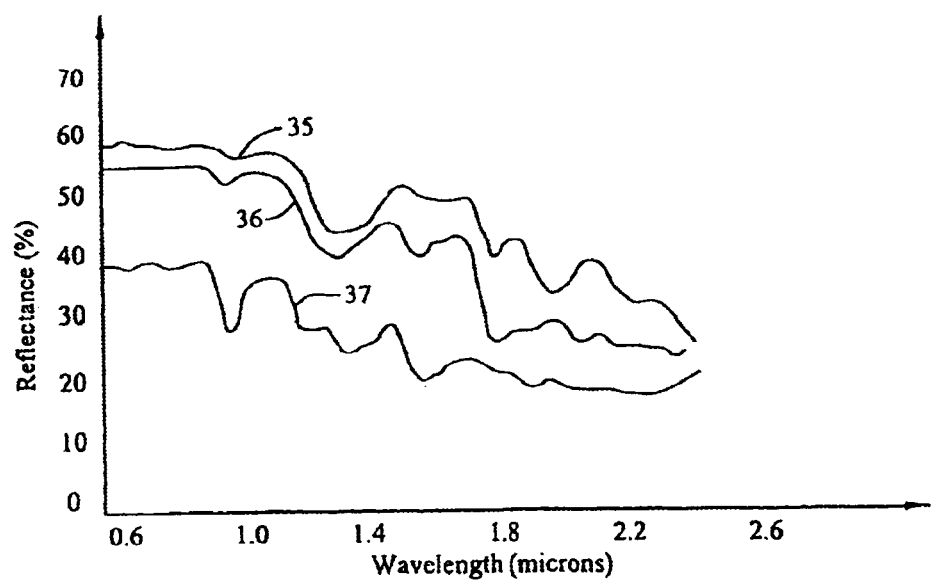

FIG. 11 is a graph of reflectance for cotton, wood and polyamide.

Figure 12:
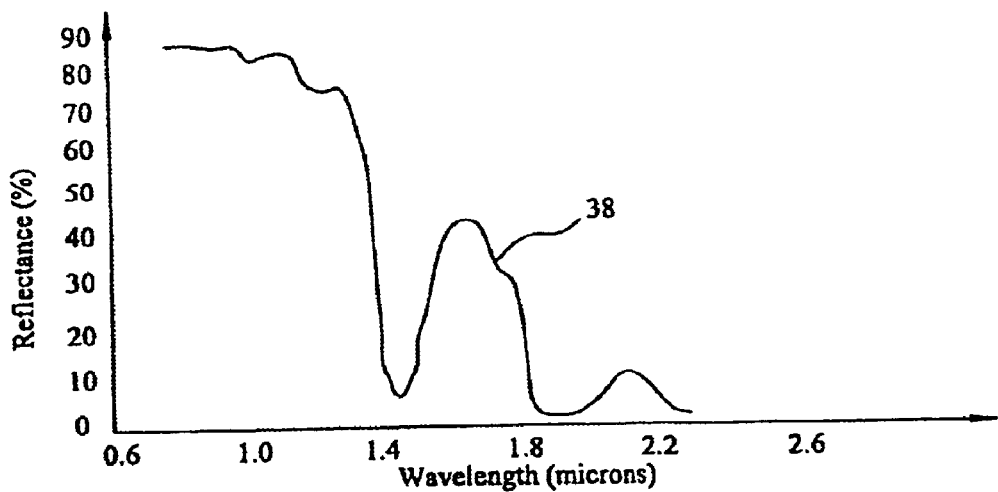

FIG. 12 is a graph of reflectance for distilled water.

Figure 13:
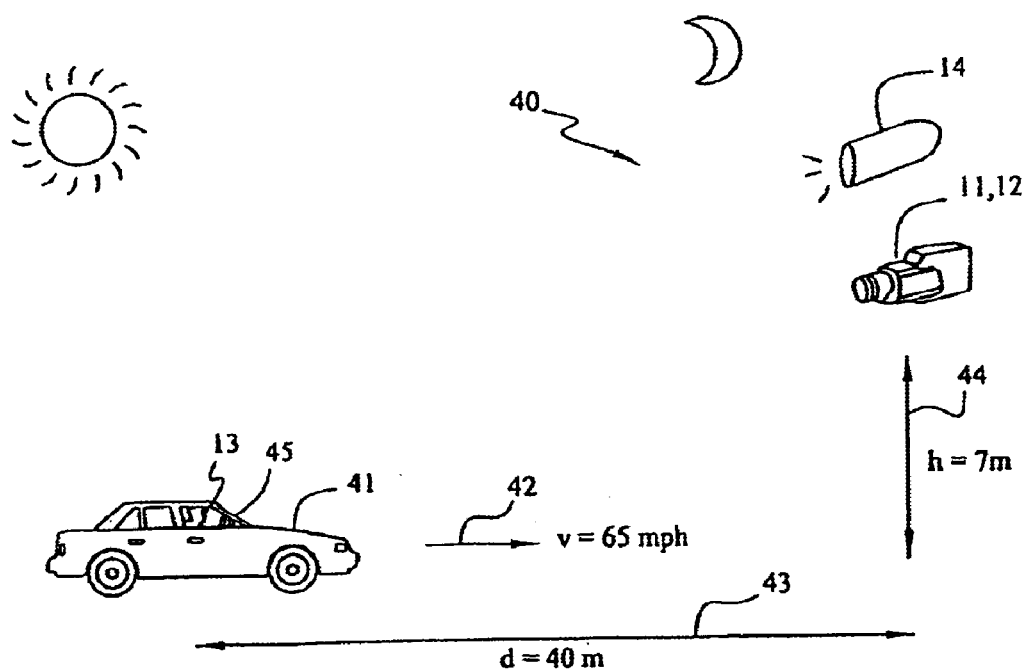

FIG. 13 shows a layout for determining the speed characteristics of a human detection system.

Figure 14A:
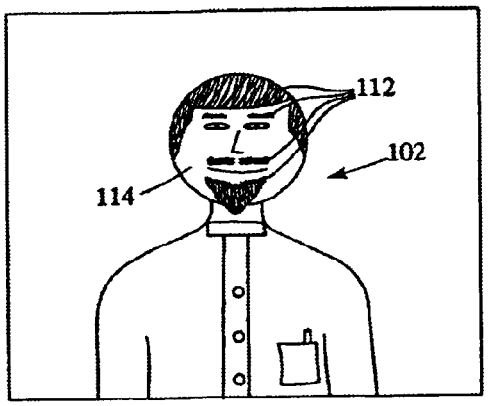
Figure 14B:
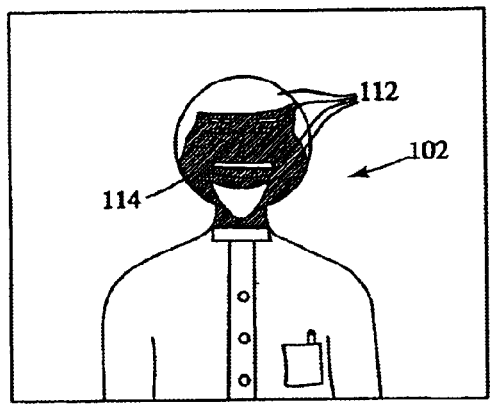

FIGS. 14A–B shows the appearance of an undisguised individual in the visible spectrum and in the upper band of the near-infrared spectrum, respectively.

Figure 15A:
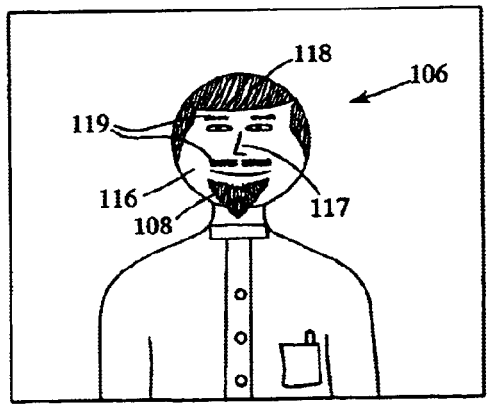
Figure 15B:
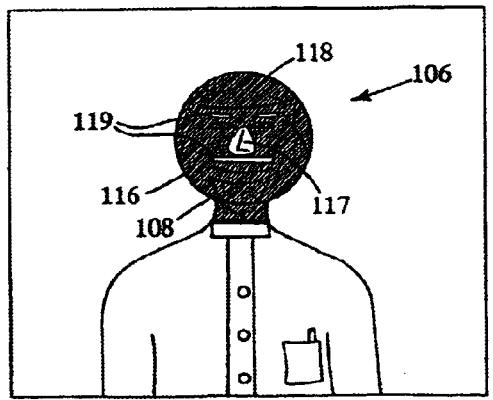

FIGS. 15A–B show the appearance of a disguised individual in the visible spectrum and in the upper band of the near-infrared spectrum, respectively.

Figure 16:
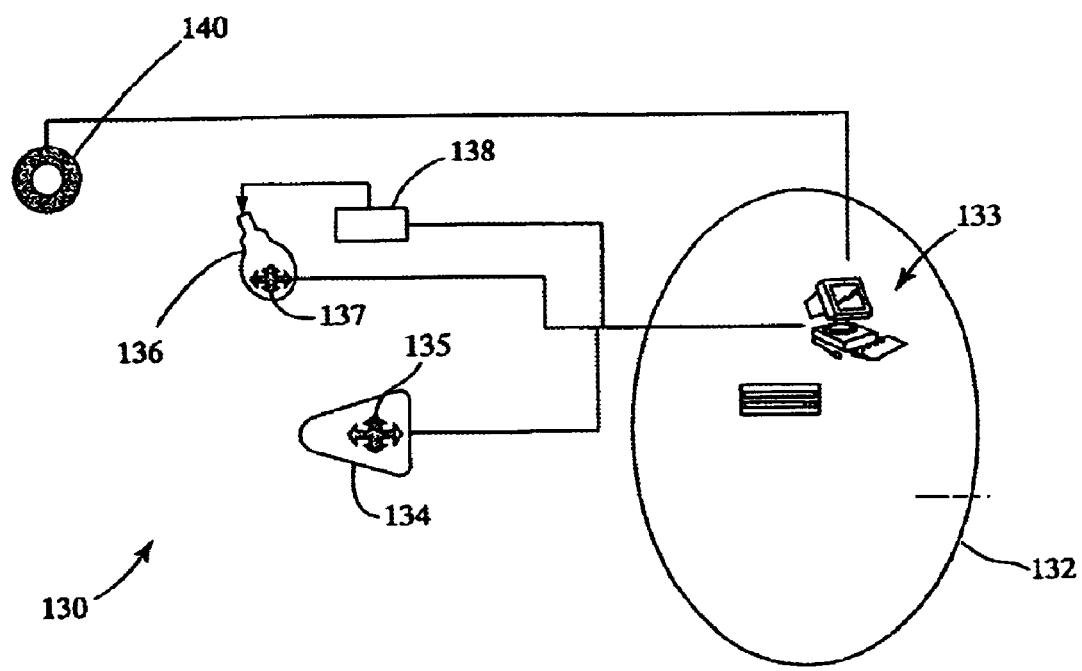

FIG. 16 shows one illustrative embodiment of a disguise detection system according to the present invention.

Figure 17:
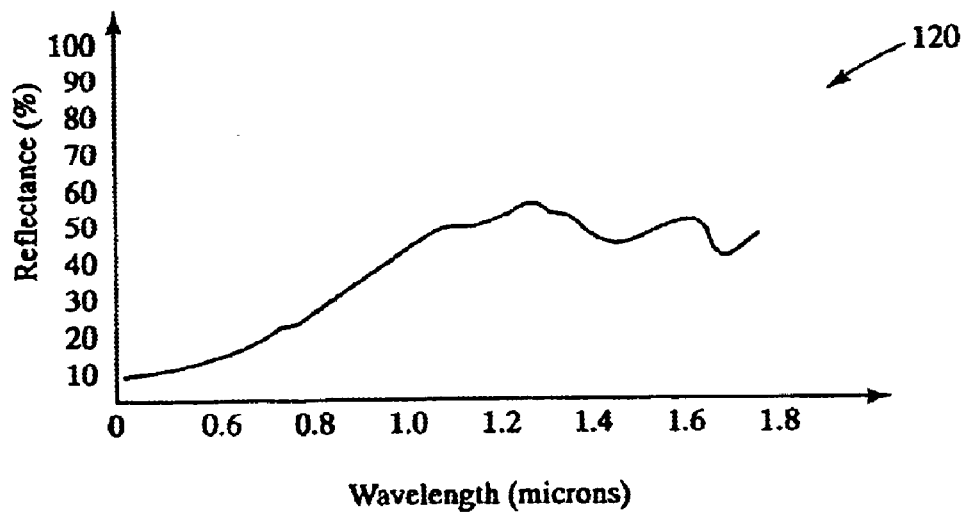

FIG. 17 is a graph of reflectance for natural human hair.

Figure 18:
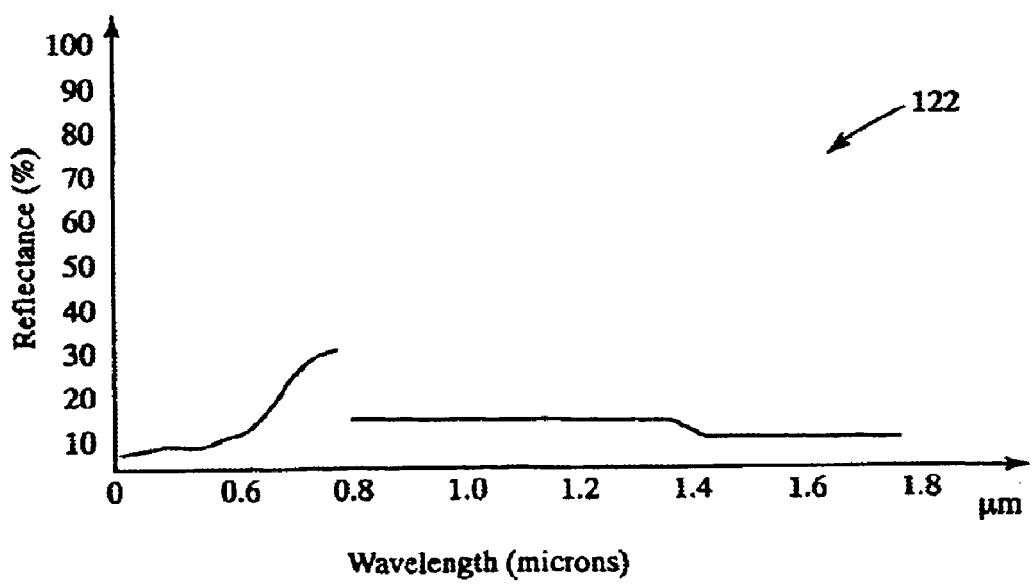

FIG. 18 is a graph of reflectance for a true human hair toupee.

Figure 19:
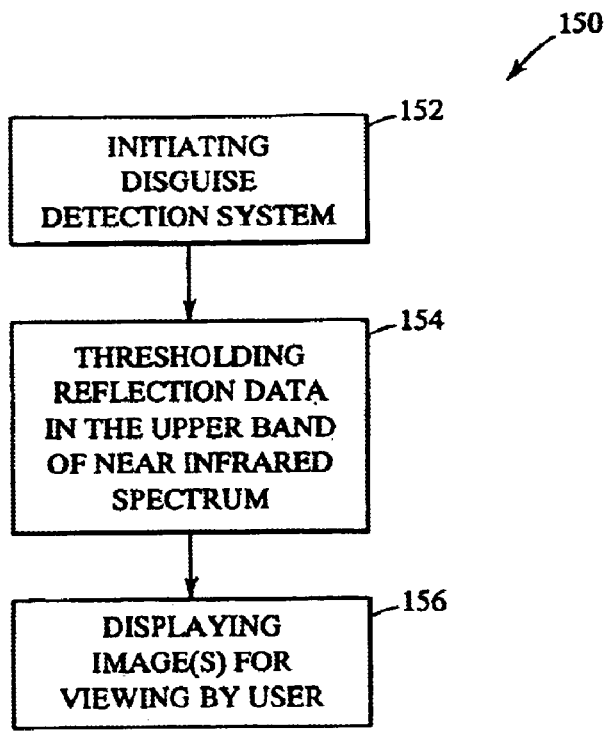

FIG. 19 is an illustrative embodiment of one disguise detection method according to the present invention.

Figure 20:
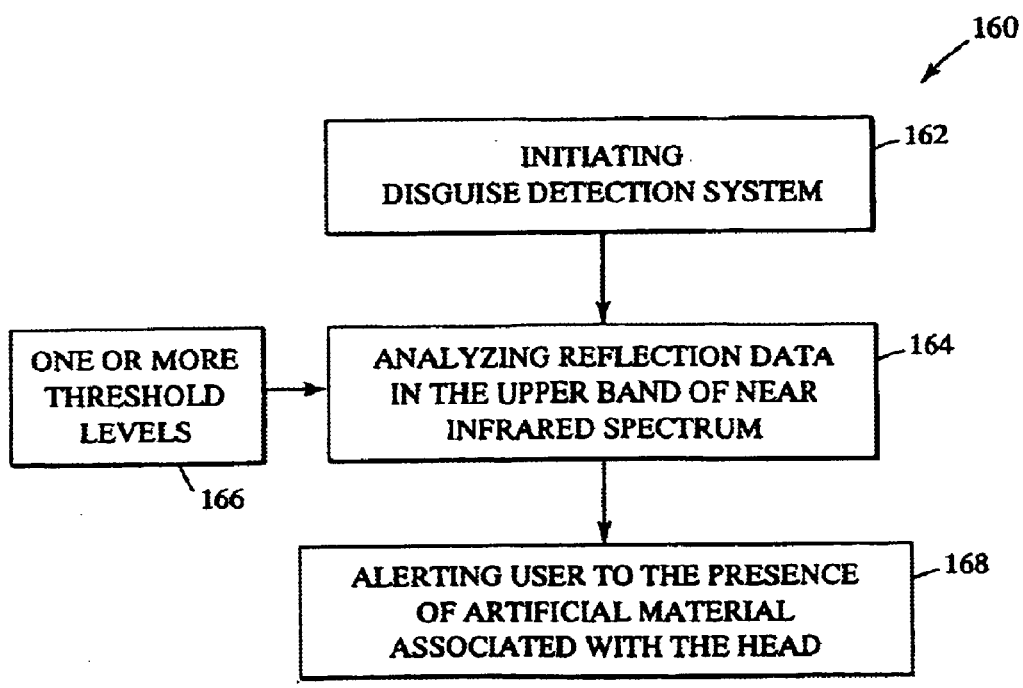

FIG. 20 is yet another alternate embodiment of a disguise detection method according to the present invention.

DETAILED DESCRIPTION OF THE EMBODIMENTS

Figure 1:
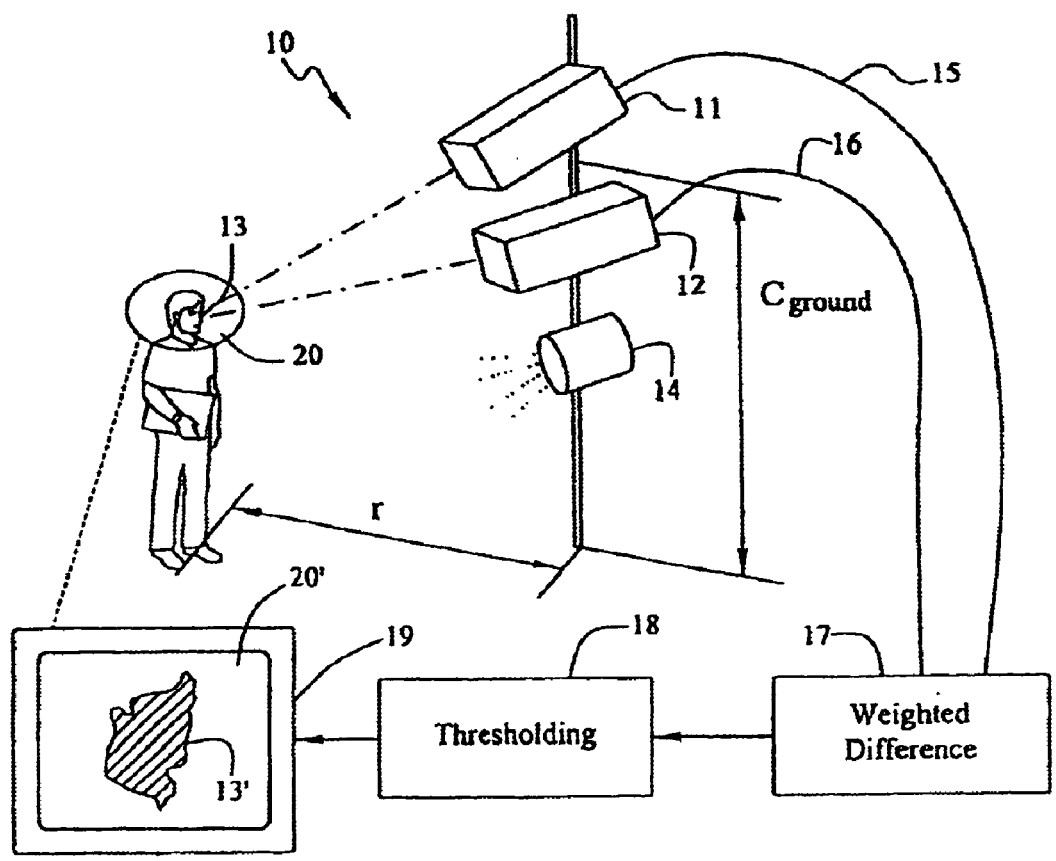
FIG. 1 shows a near-infrared fusion system for detecting humans.

FIG. 1 shows a basic layout of a near-infrared fusion system 10 for detecting humans. It is a dual-band imaging system. Two co-registered cameras 11 and 12 sense the image of, for instance, a face 13 of a human being. Camera 11 has a spectral sensitivity of 0.8 to 1.4 microns. Camera 12 has a spectral sensitivity of 1.4 to 2.2 microns. Slightly shorter or longer ranges can also yield acceptable detection results. The 1.4 micron threshold point between the two bands of spectral sensitivity is a preferable demarcation point for the dual-band system 10, but may be another value as appropriate. Each of the camera sensitivity band ranges can cross somewhat the 1.4 micron wavelength without diminishing the human detecting ability of system 10.

The quality of the imaging signals from cameras 11 and 12 remain high even during overcast days and at nighttime, because the scene being scanned by cameras 11 and 12, can be illuminated with an eye-safe near-infrared illuminator 14. Since the eye is not sensitive to the near-infrared spectrum, system 10 can remain stealthy all of the time, whether in a detection mode or not. Ideally, the camera at the lower band range (0.8 to 1.4 microns) should be an image intensifier. Therefore, the illuminator's spectral emission specification needs to match only with the upper band range (1.4 to 2.2 microns). The upper band range is quite far from the visible spectrum and illumination in these wavelengths is safe even for highway applications. Near-infrared cameras 11 and 12 provide clear imaging signals even in foul weather conditions such as hazy conditions. These particular infrared bands of detection and illumination provide for sufficient light transmission through windshields, side windows, fog, and darkness. This permits adequate detection of humans in vehicles at night and in poor weather.

The image outputs 15 and 16 of cameras 11 and 12, respectively, go to a weighted difference software process 17 or specialized hardware that fuses the outputs by performing weighted subtraction of the intensities of the two camera images. This weighted difference software or hardware may be referred to as a fuser. Such fusion of the camera outputs intensifies the silhouette of face 13 and other exposed human skin in the resultant fused image. Also, the image features a diminution of the background of the scene being covered by the cameras. This increased contrast between the person and the background in the fused image permits essentially perfect image segmentation through thresholding by a software process 18, or specialized hardware. This thresholding software or hardware may be referred to as a thresholder. The output of the thresholder 18 may go to a display 19, printer, or a post-process or specialized hardware.

A final processed image shows the exposed skin parts, such as face 13, as binary blob 13', as shown in FIG. 1. Background 20 of sensed face 13 is discounted as shown by blank background 20' in display 19. This clean-cut binary imagery ensures reliable and fast operation of a pattern recognition algorithm that identifies a human as indicated by face 13 imagery.

Figure 2A:
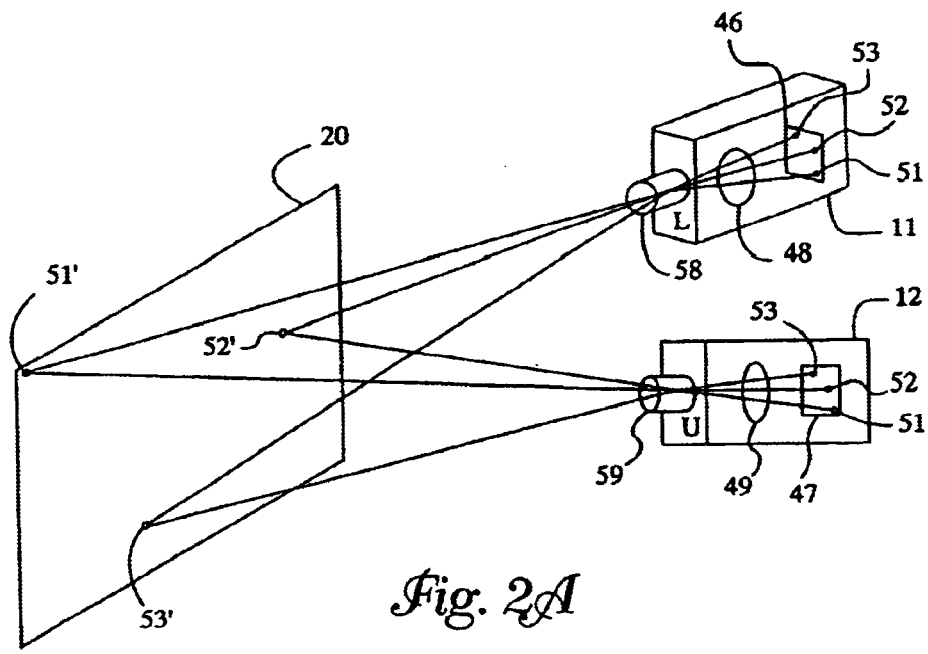
FIG. 2A illustrates a co-registration scheme for two cameras.

FIG. 2A illustrates the co-registration of cameras 11 and 12. There is spatial and time registration between the cameras. The cameras could be of the same make and model. The necessary difference between the cameras is the optical bandwidth filters, 48 and 49, which are situated between sensing arrays 46 and 47 and camera lens 58 and 59, respectively, of cameras 11 and 12. Filter 48 determines the 0.8 to 1.4 micron spectral sensitivity of array 46 in camera 11 and filter 49 determines the 1.4 to 2.2 micron spectral sensitivity of array 47 in camera 12. A polarizer may be inserted in front of lens 58 of camera 11 and in front of lens 59 of camera 12. Or instead, a polarizer may be inserted between lens 58 and array 46 of camera 11 and between lens 59 and array 47 of camera 12. Sensing arrays 46 and 47 of the cameras are the same size, for example, 512 by 512 pixels in a gallium arsenide substrate. Typically, the fields of view are the same for each array. Three pixels 51, 52, and 53, for example, are selected out for spatial co-registration. Each of the three pixels are focused on corresponding portions 51', 52', and 53', respectively, of image 20 viewed by cameras 11 and 12. That means the arrays have the same images, pixel for pixel, even though the spectral sensitivities are different. In other words, the columns and rows of pixels are aligned with the physical world scene, pixel for pixel. Once spatially co-registered, cameras 11 and 12 are kept stationary relative to the physical world.

Time co-registration of the cameras means that the cameras are in synchronization with each other from a signal perspective. The signals for each of the two corresponding pixels go to a frame buffer at the same time. The retention of light for each pixel is in the micro-second range. A typical frame time is about 33 milliseconds, which is 30 frames per second. The transfer of pixel data may be parallel, line-by-line, or serial, pixel-by-pixel, or any other style of information transfer. There is a sync signal for cameras 11 and 12 to initiate and maintain their time co-registration.

The image outputs or pixel signals 15 and 16 go to a software process or specialized hardware 17 which provides a certain weighting to each of the pixels and fuses pairs of corresponding pixels from cameras 11 and 12, respectively, into single pixels. The weighted differencing is performed pixel by pixel. Each result is the fused pixel of the two weighted differenced pixels. The weight difference equation for such fusing is $$P(i,j)_{fused} = P(i,j)_{lower\ band} - C*P(i,j)_{upper\ band}.$$

P is spectral power. The position or location of each pixel in the respective image is identified by row (i.e., "i") and column (i.e., "j"). The rows and columns of pixels of the images of cameras 11 and 12 coincide with each other. The lower band pixels are those from camera 11 and the upper band pixels are those from camera 12. The spectral power "P" for each pixel at i,j is indicated, for example, by a numeral scale of brightness from 0 to 255 for 8-bit resolution. "0" is entirely black or dark (i.e., no spectral power) and "255" is entirely white or bright (i.e., full spectral power). Numerical indications in between 0 and 255 are, of course, representative of various gradations of gray, brightness, or spectral power. "C" of the equation is a constant (i.e., weighting factor), which is determined according to the lighting of background or scene 20 and object or face 13. "C" for daytime lighting conditions is about 3 for optimal results. "C" for nighttime depends upon the spectral distribution and properties of an artificial illuminator 14.

The brightness or spectral power of a typical pixel of the lower band (image 46) may be 55 and the brightness or spectral power of the corresponding typical pixel of the upper band (image 47) may be 10. These upper and lower band pixel values are representative of skin in the corresponding bands. The spectral power of a resulting typical fused pixel, in daytime viewing, at a location of row i and column j in the daytime is determined with the following calculation.

$$P(i,j)_{fused} = 55 - 3*10$$

$$P(i,j)_{fused} = 55 - 30 = 25$$

The fused pixel signals go from software process or specialized hardware 17 to software process or specialized hardware 18 for image segmentation via thresholding of the fused pixels. Process or specialized hardware 18 emulates a comparator-like circuit in that each fused pixel below a certain threshold value (T) is assigned a value ($V_1$) of 0 and each fused pixel above the certain threshold value is assigned a value ($V_2$) of 255.

Figure 3:
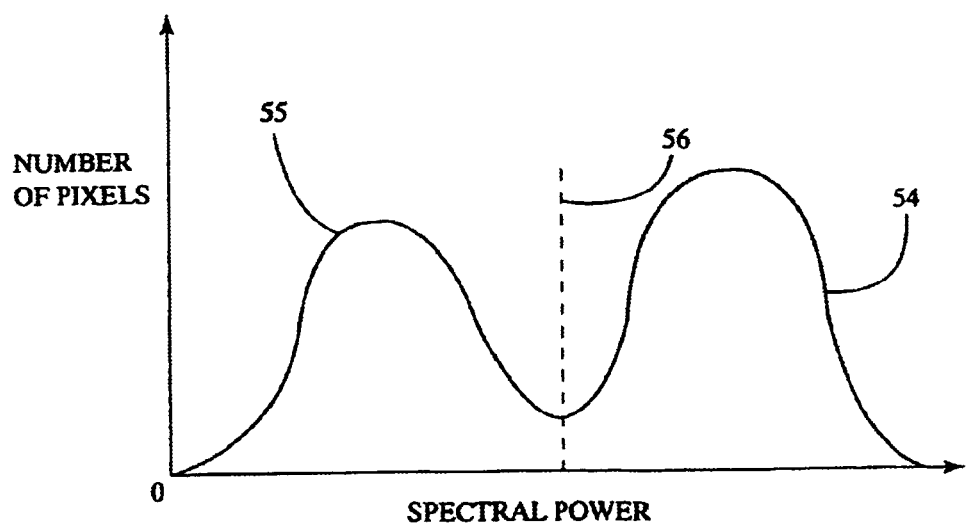
FIG. 3 is a histogram of the number of pixels versus spectral power for an image frame.

FIG. 3 shows a histogram of an image frame of fused pixels. The number of pixels for each spectral power value is indicated by curves 54 and 55 for a given sensed image. The pixels of curve 54 represent background 20 and the pixels of curve 55 represent human skin 13. Curves 54 and 55 intersect at 56 that is deemed to be the appropriate value for thresholding. If curves 54 and 55 do not intersect, then the thresholding value 56 is centered between curves 54 and 55. The threshold value is dynamic in that it changes from frame to frame, and is determined for each image frame according to the histogram of the respective frame. If the spectral value for thresholding is 20, then fused pixels having a value below 20 are valued at 0 and fused pixels having a value above 20 are valued at 255. The resulting image in display 19 has white pixels for background 20' and black pixels for face 13'. This image may be reversed by process or specialized hardware 18 such that background 20' has black pixels and face 13' has white pixels.

Figure 2B:
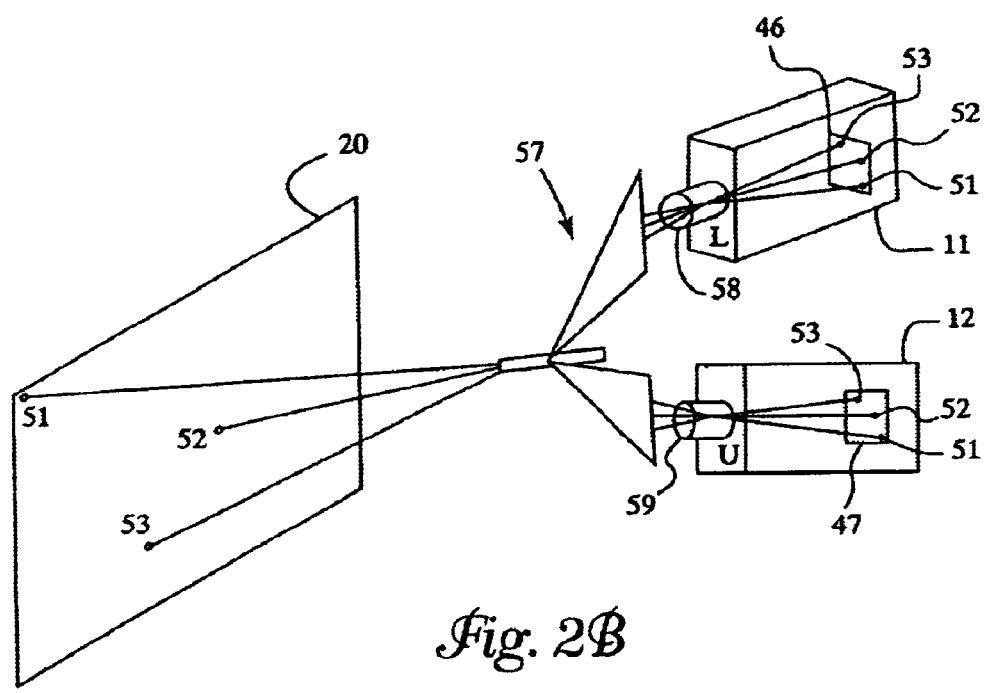
FIG. 2B shows an alternate embodiment for co-registration of the cameras.

FIG. 2B shows an alternate embodiment for co-registration of the cameras 11 and 12. As shown therein, an optical device 57, e.g., a beamsplitter/filter device, is used to provide co-registration of the cameras. The setup is essentially the same as that shown in FIG. 2A, except that the filters 47, 48 are not provided with the cameras 11 and 12. Instead, filtering is provided by the optical device 57.

As shown in FIG. 2B, light comes from the environment through the beamsplitter/filter optical device 57 to the two near infrared cameras 11 and 12 as represented by the points of light 51–53. The beamsplitter/filter optical device 57 is an optical device with a coating that performs optimally at a specific angle. The beamsplitter/filter optical device 57 directs light with wavelengths below 1.4 microns (i.e., the lower band) to camera 11 and light with wavelengths above 1.4 microns (i.e., upper band) to the other camera 12. The cameras 11, 12 are preferably connected to a computer for processing video information. However, another electronic device or a human operator may be used as an alternative to, or in addition to, the computer device. The lower and upper bands are bounded either by the beamsplitter/filter optical device's 57 sensitivity or the camera's 11, 12 sensitivity. Preferably, the lower band is 0.8 microns to 1.4 micron, and the upper band is 1.4 microns to 2.4 microns. However, other somewhat different ranges may work as well.

The beamsplitter/filter optical device 57 provides at each point in time, two co-registered frames in the upper and lower band at the hardware level of the system. Therefore, no time-consuming and generally complicated software to accomplish time registration is required like in the embodiment described above with reference to FIG. 2B.

Further, a computer controlled near-infrared illumination source may be added to the system to maintain optimal illumination levels in the scene at all times. For example, a photometer may be used to sense scene illumination and provide a signal to initiate the need for computer adjustment of the illumination source.

As one can note here, a main application of the invention is people detection in vehicles. However, people detection can be used at security points, alert areas, and so forth. An enhanced version of system 10 may be used to actually identify people.

Figure 4:
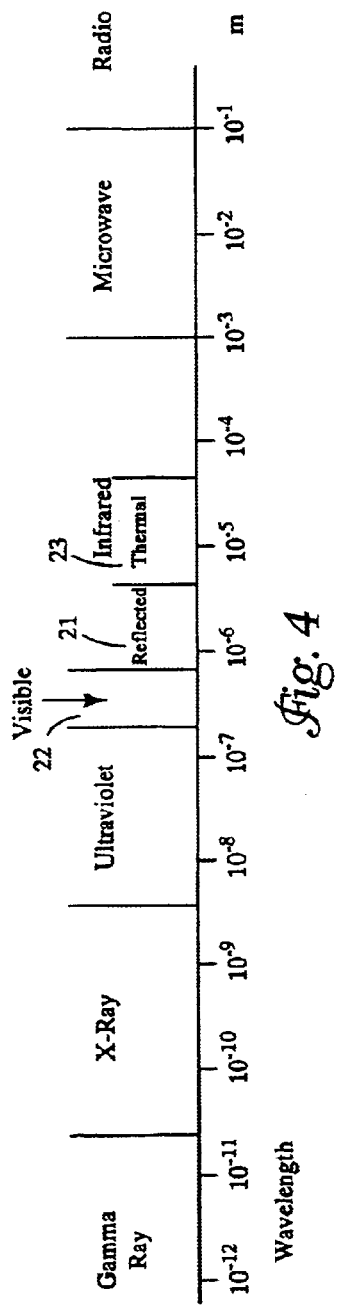
FIG. 4 is a graph of the electromagnetic (EM) spectrum.

The spectrums in which cameras 11 and 12 function are within the reflected infrared portion 21 in FIG. 4, which shows the EM spectrum. Visible spectrum 22 is the spectral sensitivity of conventional cameras. Unfortunately, visible light cameras have noise levels that increase during poor environmental conditions such as bad weather, nighttime, and direct sunlight. Some problems, such as nighttime viewing may be overcome with artificial lighting, which matches the visible spectrum of the camera, and which in vehicle occupant detection is a serious distraction to drivers. Another disadvantage is that a human face 13, which is the object of interest, does not have consistent qualities within the visible range. Vehicle occupant faces appear dark or light, depending on the physiological characteristics of the occupant, and the intensity and incident angle of illumination.

The thermal infrared band 23 (3.0 to 5.0 and 8.0 to 14 microns) is associated with thermal properties of materials. The human body is at a temperature of 37 degrees C. This means that human faces have a consistent light color in thermal infrared imaging, despite various facial colors, which is contrary to visible imaging.

The thermal property of the body provides a clear differentiator from look-alike dummies. The thermal infrared sensor can function at night without an external illuminator. One disadvantage of using the thermal infrared band 23 for occupant detection is that vehicle windshield glass greatly attenuates infrared light transmission at 2.8 microns and higher.

FIG. 5 reveals the transmittance characteristics of infrared light between 0.4 and 2.8 microns for a clean vehicle windshield (curve 24) and a dirty windshield (curve 25). Beyond 2.8 microns of thermal infrared bandwidth 23, the radiation transmittance characteristic of windshield glass is almost zero. The transmittance of a lightly tinted side window of a vehicle is good (50 to 85%), from 0.3 up to 2.8 microns as revealed by curve 26 in FIG. 6. Between 2.8 and 4.3 microns, the radiation transmittance is about 20 percent for the side vehicle window. Beyond 4.3 microns the transmittance drops to nearly zero. However, the spectral behavior of the side window permits transmittance of some thermal radiation.

Curves 27 and 28 of FIG. 7 show the percentage of reflectance of infrared light for light and dark complexion Caucasian males, respectively. The reflectance is good between 0.6 and 1.4 microns. Above 1.4 microns, the reflectance is significantly diminished. However, the difference of reflectance of light and dark complexions are minimal.

In FIG. 8, curves 29 and 30 show skin reflectance for light and dark complexions, respectively, of Asian males. Curves 31 and 32 of FIG. 9 show skin reflectance for light and dark complexions of black males. Even though the reflectance of light complexions is higher than those of dark complexions; curves 27, 28, 29, 30, 31 and 32 of FIGS. 7–9, respectively, have similar shapes and all of them drop off at about 1.4 microns. These reflectances show some variation for all complexions of the Caucasian, Asian, and black males, between 0.6 and 1.4 microns.

Curves 33 and 34 of FIG. 10 show the reflectance for more extreme differences of light skin and dark skin, respectively. The reflectance of light and dark skin are significant up to 1.4 microns. After 1.4 microns, reflectance curves 33 and 34 for light and dark skin, respectively, become almost coincident and the resultant reflectance drop below 20 percent. Thus, in the near-infrared bands of 1.4 and above, the reflectance of detected humans of all kinds of skin shade, are about the same at wavelengths greater than 1.4 microns.

In FIG. 11, curves 35, 36, and 37 show the reflectance for cotton, wood, and polyamide respectively, to be significant not just between 0.6 and 1.4 microns, but beyond 1.4 microns. The insignificant drop in reflectance after the 1.4 micron threshold point, is a basis that shows a large contrast in reflectance between the human face and inanimate objects, such as upholstery, the dashboard, and fabrics in a vehicle, which are background, and provide for easy detection of the human face in the range of 1.4 to 2.2 microns.

Consequently, there is a significant contrast, in reflectance between the images of a Caucasian male and a dummy head from a camera operating in the range between 1.4 and 2.2 microns. The image of the dummy is reflective and appears rather bright and the male human image is dark and thus the resultant contrast between the two images is rather stark. This person detection scheme is much superior to visible light imaging, since the latter scheme reveals little or no contrast between the Caucasian and dummy heads of like colors. In summary, it is easy to distinguish images of the human head from those of the dummy head in the 1.4 to 2.2 micron range imagery, but not easy to distinguish the images of the respective heads from each other in the 0.8 to 1.4 micron range imagery.

The lower reflectivity of human skin for the 1.4 to 2.2 micron spectral range is explained by the spectral reflectance of distilled water as shown by curve 38 of FIG. 12. There is a substantial drop in reflectance at about 1.4 microns. Beyond 1.4 microns, the water absorbs substantial infrared radiation and appears in an image as a dark body. Since the composition of the human body consists of 70 percent water naturally, its spectral response is similar to that of water. So camera 12, operating in the 1.4 to 2.2 micron range, captures this unique human body differentiator. With the operating range of camera 12, one can safely use during nighttime a matching near-infrared illumination source 14 to improve the quality of the sensed image of face 13. This light is invisible to humans, such as vehicle drivers, but also is harmless to their eyes since the wavelength of illuminator 14 is above the safe threshold of 1.4 microns.

Also, since cameras 11 and 12 of system 10 operate at a lower band than the mid-infrared band, glass penetration is not a problem and cameras 11 and 12 can easily detect through the frontal windshield of a vehicle. Thus, speed requirements for cameras 11 and 12 are less restrictive. In an actual highway site, a zoom lens would be used.

FIG. 13 shows a layout of a near-infrared system 40 for determining the speed characteristics of the human detector. A vehicle 41 may be assumed to be moving down a highway at a velocity v, as shown by vector 42, and be observed in a frontal view with a near-infrared camera 11 or 12 at a distance d, as shown by line 43, and from a height h, as shown by line 44. Only one of the cameras 11 and 12 is needed for this evaluation, but it may be either one of them. Camera 11, 12 may be a Sensors Unlimited Inc. SU 320 equipped with a telephoto lens, a band-pass filter in the range 1.4 to x microns (where x>1.4 microns), and a polarizing filter to reduce the glare effect from the sun illumination during daytime.

During the daytime, system 40 uses the illumination of the sun. The objective is to determine if there is any appropriate geometric arrangement for camera 11, 12 so that the signal to noise (S/N) ratio and the camera speed are kept at acceptable levels even under adverse conditions. An acceptable (S/N) ratio is considered anything above 35. The speed quality is considered acceptable when the image smearing does not exceed the width of one pixel.

The first step in a radiometric computation is to determine the amount of radiation that falls upon the objects of interest such as the occupants of vehicle 41. The spectral band considered is above the 1.4-micron threshold point. Because of constraints due to the quantum efficiency of the camera SU-320 that was used in the actual experiments, one limits the spectral band in the range of 1.4 to 1.7 microns. Slightly modified things are in effect for the extended range of 1.4 to 2.2 microns. The spectral irradiance of the sun (the illumination source) on a clear day at sea level is approximately $I_{sunny}$=0.008 Watts/cm$^2$ in the 1.4 to 1.7 micron band range. In this computation, however, one considers the worst case scenario of an overcast day. For an overcast day, the irradiance value is reduced by $10^{-3}$ thus giving irradiance at vehicle 41 of approximately $$I_{overcast} = 10^{-3} * I_{sunny}$$
$$= 10^{-3} * 0.008$$
$$= 8 \ \mu\text{Watts/cm}^2.$$

The transmittance in this spectral range of windshield 45 of vehicle 41 is approximately 0.4 resulting in an irradiance on the vehicle occupants of $$I_{occupant} = 0.4 * I_{overcast}$$
$$= 0.4 * 8$$
$$= 3.2 \ \mu\text{Watts/cm}^2.$$

The second step in a radiometric computation is to determine how much of the incident radiation on the objects of interest is reflected back to the sensor (i.e., near-infrared camera 11, 12). The radiance into a hemisphere assuming a reradiate of 0.4 would be $$R_{occupant} = 0.4 * I_{occupant} / \pi$$
$$= 0.4 * 3.2 / \pi$$
$$= 0.4 \ \mu\text{Watts/cm}^2 - \text{steradian.}$$

This represents the reflected portion of the occupant irradiation. The occupant's body absorbs the rest. The reflected radiation has to pass through windshield 45 and the camera 11, 12 lens to reach the near-infrared sensor array of camera 11, 12. One assumes a 0.4 windshield transmittance, a f/2 camera lens (i.e., having a 14.32° cone angle) with 0.8 transmittance, a polarizer with 0.4 transmittance, and a band-pass filter with 0.6 transmittance. Then, the irradiance at the sensor array of camera 11, 12 will be $$I_{camera} = 0.4 * 0.8 * 0.4 * 0.6 * \pi * R_{occupant} * \sin^2(14.32^0)$$
$$= 0.4 * 0.8 * 0.4 * 0.6 * \pi * 0.4 * \sin^2(14.32^0)$$
$$= 0.006 \ \mu\text{Watts/cm}^2.$$

Camera 11, 12 has square pixels with a side of $37.5*10^{-4}$ cm or an area $$A = 37.5 * 10^{-4} * 37.5 * 10^{-4}$$
$$= 1.40 * 10^{-5} \ \text{cm}^2.$$

Consequently, the radiant power on the camera 11, 12 pixel will be $$P_{pixel} = A * I_{camera}$$
$$= 1.4 * 10^{-5} * 0.006$$
$$= 0.084 * 10^{-12} \ \text{Watts.}$$

The camera's detectivity D* is D*=$10^{12}$ cm √Hz/Watts. The noise equivalent power (NEP) is related to detectivity D*, pixel area A, and electronic bandwidth Δf by the following equation:

$$NEP=(A/\Delta f)^{1/2}/D*.$$

The bandwidth Δf is determined by the exposure time of camera 11, 12. The exposure time depends on vehicle 41 velocity 42, camera range 40, and the camera 11, 12 field of view such that the images smear less than 1 pixel. Assuming vehicle 41 traveling at a speed of 65 mph, at a distance d 43 of 40 meters (m) away from camera 11, 12, and with a field of view of 1.6 m, the 320×240 pixel array of camera 11, 12 gives a maximum exposure time of 1 ms or a bandwidth of Δf=1 kHz. Substituting the values for A, Δf, and D* in the formula of NEP, one gets $$NEP=1.18*10^{-13} Watts.$$

Therefore, the signal to noise ratio S/N will be $$S/N=(P_{pixel}/NEP)=0.7.$$

In conclusion, assuming a worst case scenario (overcast day, dirty windshield, dark occupant skin) one determines that camera 11, 12, equipped with a f/2 lens, a 1.4 to 1.7 μm filter, and a polarizer, if it is positioned at a distance 43 of d=40 m from incoming car 41 and at a height 44 of h=7 m at the specified distance 43, will achieve an acceptable smear of less than one pixel because the required exposure time of 1 ms is within the camera's speed capabilities. The signal to noise ratio (S/N) is 0.7. To boost the S/N ratio to a higher value on overcast days, one needs to employ an illumination source 14. Illumination source 14 will also be helpful during nighttime. If one operated in the visible spectrum, the use of an illuminator in the high occupancy vehicle (HOV) lane would be prohibitive. Fortunately, in this case, the spectral signature of illuminator 14 for the 1.4 to 1.7 micron waveband can be safely employed in the HOV lane.

Post processing includes a neural network that performs automatic vehicle occupant detection. The vehicle occupant detection approach is based upon a fuzzy neural network algorithm. The perfect binary image provided by the fusion approach described above facilitates high correct detection rates.

Further, with reference to several previous Figures, and also FIGS. 14–20, disguise detection systems and methods are described wherein reflection properties of natural human anatomy (e.g., natural skin and hair) in the upper band of the near-infrared spectrum are used to provide for disguise detection, e.g., the detection of the presence of artificial materials associated with the head of the human body.

The human skin has extremely low reflectance in the upper band of the near-infrared spectrum (i.e., 1.4 μm and greater in the near infrared spectrum) as previously described herein with reference to FIGS. 7–10. Such FIGS. 7–10 showed that human skin has a high reflectance between 0.6 and 1.4 microns. However, above 1.4 microns, the reflectance is significantly diminished. Since almost everything else in a typical scene has a higher reflectance in the upper band of the near-infrared spectrum greater than 1.4 μm, there is sharp contrast between the human skin, e.g., face and neck, and the background.

Further, as shown by FIGS. 7–10, the skin reflectance property, i.e., that the reflectance of human skin above 1.4 microns in the upper band of the near infrared spectrum is significantly diminished, is universal across the human race, e.g., there is little difference in such reflectance properties above 1.4 microns in the upper band of the near infrared spectrum when comparing Caucasian, asian, and black persons. For example, FIG. 7 shows a drop-off in reflectance at or about 1.4 microns for Caucasian males, FIG. 8 shows such a drop-off for asian males, FIG. 9 shows such a drop-off for black males, and FIG. 10 shows the drop-off for extreme differences of light skin and dark skin. As such, and as previously described herein, in the near-infrared band of 1.4 and above, the reflectance of natural skin of detected humans of all kinds of skin shade are about the same at wavelengths greater than 1.4 microns.

In contrast to the natural skin, human hair, i.e., natural hair, is highly reflective in the upper band of the near infrared spectrum above 1.4. Such reflectance is also a property that is universal across the human race. The highly reflective nature of human hair in the upper band of the near infrared spectrum above 1.4 microns is generally shown in FIG. 17. In FIG. 17, a reflectance diagram of natural human hair in at least a portion of the near-infrared spectrum is shown. Three separate reflectance measurements on a natural human hair specimen produced the high reflectance properties shown in the diagram.

In contrast to the high reflectance of natural human hair, a reflectance diagram of a human hair hairpiece (an artificial material as later defined herein) is shown in FIG. 18. As shown therein, in the upper band of the near-infrared spectrum, reflectance is much lower than natural hair. Even if true human hair is used to be fitted in a toupee, due to the chemical processing used in making a toupee, the reflective characteristics are altered. Although the difference in reflectivity when comparing a true human hair wig to true natural human hair is much subtler, such reflectivity differences are still substantial and can be easily captured.

In addition, the reflectance of various artificial materials, such as those used in disguises and as generally defined below (heavy make-up, artificial face parts, add-on hair, etc.) generally have a reflectance that is significant beyond 1.4 microns. For example, as shown in FIG. 11, and previously described herein, the reflectance properties for cotton, wood, and polyamide do not drop significantly in reflectance after the 1.4 micron point. As such, there is a significant contrast in reflectance properties between natural human skin and other artificial materials, and also between natural human hair and artificial materials, in the upper band of the near infrared spectrum.

Yet further, as previously described herein, radiation in both the upper and lower near-infrared bands can transmit through the window glass of vehicles. Therefore, this is a definite advantage compared to both the visible and the thermal infrared spectrums. As such, the present invention which uses the upper band of the near-infrared spectrum can detect disguised faces even within vehicles. The transmission characteristics through the window glass of vehicles is shown in the diagrams of FIGS. 5 and 6. As shown therein and as described previously herein, FIG. 5 reveals the transmittance characteristics of infrared light between 0.4 and 2.8 microns for a clean vehicle windshield (curve 24) and a dirty windshield (curve 25). Beyond 2.8 microns at the beginning of the thermal infrared bandwidth, the radiation transmittance characteristic of windshield glass is almost zero. However, transmittance at less than 2.4 microns is very good. The transmittance of a lightly tinted side window of a vehicle is good (50 to 85%), from 0.3 up to 2.8 microns as revealed by curve 26 in FIG. 6. As such, transmittance levels in the upper band of the near-infrared region below 2.8 microns are very good.

The present invention uses at least a portion of the upper band of the near infrared spectrum. As used herein, the upper band of the near-infrared spectrum includes the range from 1.4 microns to 2.8 microns. As previously indicated herein, at 2.8 microns thermal energy begins to appear. Preferably, according to the disguise detection systems and methods described herein, at least a portion of the upper band of the near-infrared spectrum within the range of 1.4 microns and above is used. More preferably, at least a portion of the upper band of the near-infrared spectrum within the range of 1.4 microns to 2.4 microns is used. Yet more preferably, at least a portion of the upper band of the near-infrared spectrum within the range of 1.4 microns to 1.7 microns is used.

One skilled in the art will recognize that slightly shorter or longer ranges can also yield acceptable detection results. For example, with respect to the ranges given above, a deviation from such wavelength values which may produce acceptable detection results is contemplated to fall within the specified ranges.

Further, as used herein, artificial materials include any materials other than natural skin and/or natural hair, such as those items or materials used for disguise purposes. For example, wigs, make-up materials, artificial nose pieces, etc., formed from one or more artificial materials or inanimate objects such as polymers, fibers, etc., are referred to herein as artificial materials. Further, background objects are also referred to herein as artificial materials, e.g., a car behind a person, clothing of a person, etc.

Generally in disguise situations, an individual alters his or her facial appearance through the addition/application of a fake nose, make-up, wig, artificial eyelashes, and the like. Professional actors routinely use this method for needs of their acting roles. A well done disguise by this technique is very difficult or impossible to be detected in the visible spectrum. Generally, the face has been touched with a make-up material to integrate smoothly the fake nose. Although disguises are usually very simplistic, the facial appearance of the person changes substantially. As such, there is no way to visually detect the deception without prior knowledge.

Detection systems and methods described herein are able to detect disguises due to the fact that any artificial materials applied to the head of the human, e.g., facial skin or scalp, alters to various detectable degrees the respective unique infrared signatures of such humans, particularly in the upper band of the near-infrared spectrum. Therefore, although disguise configurations can easily fool the eye in the visible spectrum, such disguises are immediately apparent in the upper band of the near-infrared spectrum.

The reflectance characteristics of various artificial materials, and also natural hair and natural skin of the human body, as described above can be more clearly understood through the display of such reflectance characteristics as shown or described further below with reference to FIGS. 14A–B and FIGS. 15A–B. FIG. 14A shows an undisguised human head 102 in a visible spectrum. The human head 102 includes a facial portion 114 of natural skin and natural human hair 112 including a beard, a mustache, eyebrows, and scalp hair.

FIG. 14B shows the undisguised human head 102 in the upper band of the near-infrared spectrum based on the reflectance properties in the scene. In the upper band of the near-infrared spectrum, the natural human skin of the facial portion 114 has a dark appearance due to its low reflectance characteristics. On the other hand, the facial hair 112 including the beard, mustache, eyebrows, and scalp hair has a bright appearance due to its highly reflective nature in the upper band of the near-infrared spectrum. As such, the undisguised person has a unique near-infrared signature due to the reflectance characteristics of the person's natural hair and natural skin in the upper band of the near-infrared spectrum. As previously described herein, such characteristics are universal for the entire human species.

FIG. 15A shows a disguised human head 106 in the visible spectrum. The disguised human head 106 includes a facial portion 116 having natural skin but with a fake nose 117 fitted thereon and touched up by make-up. Further, the disguised human head 106 includes a wig 118 covering the scalp of the human head and a fake beard 108. Natural hair components 119 include the eyebrows and mustache.

Such a disguise is not detectable in the visible spectrum, as shown in FIG. 15A. However, the artificial materials alter radically the signature of the person's head in the upper band of the near infrared spectrum. As a result, facial skin appears very bright in the area of the fake nose 117, and is an obvious abnormality in the upper near-infrared band as shown in FIG. 15B. In contrast, the artificial hair wig and beard has much lower reflectivity than natural human hair in the upper band of the near-infrared spectrum. As a result, the artificial hair 108, 118 of the human head 106 appears very dark in the image, due to its low reflectivity, and the natural hair, i.e., the mustache and eyebrows 119, appear bright.

Such abnormalities are readily detectable, as can be seen in FIG. 15B. In FIG. 15B, the human head 106 shows the abnormal dark hair 118 covering the scalp and abnormal dark beard 108. If such hair were natural hair, it would have a similar brightness as that shown in FIG. 14B and like the natural hair 119 including the eyebrows and mustache. Likewise, further, the artificial materials used to form the fake noise 117 are clearly abnormal due to their high reflectivity compared to the other natural skin facial portion 116.

As described above, it can be readily seen that an imaging system based on the reflectivity in the upper band of the near-infrared spectrum provides advantageous disguise detecting ability. Such a system and method is based on various reflectivity characteristics in the upper band of the near-infrared spectrum. Such characteristics include at least: that the human skin has very low reflectivity in the upper band of the near-infrared spectrum and always ranks amongst the darkest objects in the scene; that artificial materials, e.g., facial disguise materials, feature high reflectivity in the upper band of the near-infrared spectrum and always rank among the brightest objects in the scene and, as such, when they are applied to natural skin and hair of the human head, they alter totally its phenomenology and facilitate easy detection in the imagery by a human observer or a machine vision system; that the natural human hair has high reflectivity in the upper band of the near infrared spectrum and always ranks amongst the brightest objects in the scene; and further that artificial hair or even true human hair wigs feature low reflectivity in the upper band and always rank amongst the darkest objects in the scene and, as such, when they are applied to the scalp or to the face of a human head, they alter totally the expected phenomenology and facilitate easy detection in the imagery by a human observer or a machine vision system.

FIG. 16 shows one illustrative embodiment of a disguise detection system 130 according to the present invention. The disguise detection system 130 includes circuitry 132, an upper near-infrared camera 134, a photometer 140, an upper near-infrared illuminator 136, and a computer-controlled power supply 138. The upper near-infrared camera 134 may be a camera like that previously described herein with reference to FIGS. 1 and 2. The camera is sensitive to at least a portion of the upper band of the near-infrared spectrum, preferably in the range of 1.4 microns and above, more preferably in the range of 1.4 microns to 2.4 microns, and even more preferably in the range of 1.4 microns to 1.7 microns in the upper band of the near-infrared spectrum.

Such cameras generally have a sensing array, for example, an array of pixels that provide signals based on the light captured thereby, as is readily known to those skilled in the art. The pixel signals representative of the image based on the light captured is provided to circuitry 132. For example, the upper near-infrared camera may be a camera available from Sensors Unlimited, under the trade designation SU-320.

Preferably, circuitry 132 includes a computer system 133 operable to execute software to provide a user with information as to the presence of an artificial material associated with the head of the human body based on the detected reflection in the upper band of the near-infrared spectrum. Although the circuitry 132 may be implemented using software executable using a computer apparatus, other specialized hardware may also provide the functionality required to provide a user with information as to the presence of an artificial material associated with the head of the human body, e.g., information concerning a disguise. As such, the term circuitry as used herein includes not only specialized hardware, but may also include circuitry such as processors capable of executing various software processes.

For example, the computer system 133 may be any fixed or mobile computer system, e.g., a personal computer or a minicomputer. The exact configuration of the computer system is not limiting and most any device capable of providing suitable computing capabilities may be used according to the present invention. Further, various peripheral devices, such as a computer display, a mouse, a keyboard, memory, printer, etc., are contemplated to be used in combination with a processing apparatus of the system.

The detector or photometer 140 is operable to detect an illumination level proximate the head of the human body which is in the scene being captured by camera 134. The photometer 140 provides information to the computer system 133 based on the detected illumination level. The computer system 133 is operable to control the upper near-infrared illuminator 136 which is an illumination source matched to the upper band of the near-infrared spectrum used to perform the method according to the present invention. The upper near-infrared illuminator 136 is positioned to illuminate at least a portion of the head of the human body, e.g., the scene in which the human body is located. The circuitry 132, e.g., the computer system 133, is operable to control the upper near-infrared illuminator 136 based on the detected illumination level provided by the photometer 136 to maintain a desired illumination level of the head of the human body, e.g., illumination of the scene in which the human body is located. In one embodiment, software of computer system 133 may be used to automatically adjust the illumination level of the upper band near-infrared illuminator 136 to maintain an optimal illumination level in the scene at all times. The adjustment of the illumination level is based on the readings from photometer 140 and may be realized through power supply 138.

The illumination assists in the production of a high quality imaging signal from the camera 134, even during overcast days and at night. Such illumination can be used because the scene can be safely illuminated with such eye-safe near-infrared illuminators. Also, since the eye is not sensitive to the near-infrared spectrum, the system remains stealth at all times. Any suitable photometer and illuminator may be used to provide for suitable illumination of the scene in which the human body being captured by the camera 134 is located.

Both the camera 134 and illuminator 137 may be moved by any suitable structure represented by arrows 135 and 137, respectively, such that a larger field of view may be possible. For example, the camera 134 may be moveably mounted for capturing images in a 180° field of view, and likewise illuminator 136 may be moved so as to provide adequate illumination to achieve an imaging signal from camera 134 of sufficient quality to perform disguise detection.

Using a detection system such as, for example, the disguise detection system 130 of FIG. 16, various methods of determining the presence of an artificial material associated with the head of the human body based on the detected reflection may be performed. Two illustrative embodiments of such methods are shown in FIGS. 19 and 20. The method 150 shown in FIG. 19 provides for detection by a human observer, such as by viewing displayed images as shown in FIGS. 14 and 15. FIG. 20 shows an illustrative embodiment of a method 160 which includes additional processing of the data to provide additional information to the user other than just displayed images, e.g., such as information that may be provided using a machine vision system, or other information instead of displayed images.

The method 150, illustratively shown in FIG. 19, will be described with reference to the displayed images of FIGS. 15A and 15B. The method 150 includes initiating the disguise detection system (block 152). Upon initiating the disguise detection system (block 152), image data representative of the reflection in at least a portion of the upper band of the near-infrared spectrum is captured by camera 134. The reflection data from camera 134, e.g., pixel signal data, is provided to the circuitry 132, e.g., a computer system 133, which may operate on the data using a thresholding process (block 154) so as to manipulate the data and to provide an image to be displayed for viewing by a user (block 156).

Various thresholding techniques have been used as is readily known to those skilled in the art. Any suitable thresholding process that provides for acceptable segmentation of dark and light regions may be used according to the present invention. In general, such thresholding processes compare the data representative of the reflection to one or more thresholding values. Such values may be based on a variety of factors, such as the reflection characteristics of natural skin, of natural hair, etc. For example, a thresholding process described in the article entitled "A Threshold Selection Method from Gray-Level Histograms" by Otsu, *IEEE Transactions on Systems, Man And Cybernetics*, Vol. SMC-9, No. 1, January 1979, may be used according to the present invention. The thresholding process generally involves a non-parametric and unsupervised method of threshold selection. An optimal threshold is selected so as to maximize the separability of the resultant classes in gray levels. The algorithm utilizes only the zeroth-order and the first-order cumulative moments of the gray level histogram. The speed of the system, in part because of the thresholding process, can provide real time images to the user.

The user when presented with the displayed image such as shown in FIGS. 14B and 15B (block 156) can then view any abnormal characteristics of the image, e.g., the bright nose feature 117 representative of a fake nose, the dark facial hair features 108 and 118 which are abnormally dark compared to natural hair, etc. as shown in FIG. 15B. Upon detection of such abnormalities by the user, appropriate action may be taken. Such action may include the sounding of an alarm, direct contact with the disguised individual, etc.

In such a method 150, there may be a direct correlation between the level of reflectance and the brightness of features like that represented in FIG. 15B, e.g., high level of reflectance being shown as bright feature. However, additional processing in conjunction with the thresholding process may be used to display detected artificial materials in any differentiating manner. For example, the skin 116 may actually be represented as a first shade and the nose being abnormally represented as a different shade easily recognized by a user. For example, the brightness of the portions of the image may be reversed from that shown in FIG. 15, e.g., the fake nose is dark and the skin is brighter than the fake nose.

The method 160, illustratively shown in FIG. 20, includes initiating the disguise detection system (block 162). Once the data has been captured by camera 134 and provided to the computer system 133, the reflectance data, e.g., pixel signal data, from camera 134 is analyzed (block 164). The data may be analyzed in one or more different manners.

In one illustrative embodiment, for example, the data may be compared to one or more threshold levels. The one or more threshold levels (block 166) provided for comparison to the reflection data may be threshold levels based simply on the natural skin and natural hair reflectance characteristics. However, such threshold levels may also be based on a plurality of reflectance properties of the artificial materials themselves used in disguises. As such, the reflectance characteristics of a number of known disguise materials can be mapped into a multi-level thresholding algorithm. With use of such a multi-level thresholding algorithm, not only can detection of disguises be attainable, the detection and existence of specific materials used in the disguises may be obtained by the detection of reflectance and comparison using the multi-level thresholding algorithm.

For example, reflectance measurements in the upper band of the near-infrared spectrum may be gathered for all known possible disguise materials used in the trade. A direct mapping between different artificial materials and thresholding levels corresponding to a particular reflectance characteristic can be performed. Likewise, various other disguise situations may be mapped. For example, a list of facial images featuring just a single disguise item, e.g., a fake mustache only or a heavy make-up only, may be mapped. As will be recognized, the list of disguises which may be mapped is unlimited, however, a multi-level thresholding scheme can be developed that may be used to identify any number of various disguises. As such, with the use of a multi-level thresholding scheme, the identification of one or more artificial materials associated with the head of the human body can be identified and the user alerted to the presence of such artificial materials (block 168). For example, upon comparing the reflection data from the camera 134, with use of computer system 133, to such a multi-level threshold reference map, an alert may be presented to the user indicating the presence of an artificial material associated with the head (block 168). The user may then take appropriate action.

The user may be alerted in any number of ways. For example, information may be displayed, a silent alarm may be used, an audio alarm, a tactile alarm, etc. Such information displayed may include, for example, an alarm mechanism, information as to the disguised person, the disguised materials being used, and/or the level of security risk involved with the disguised person.

It will be recognized that various methods and systems described herein may be used in combination and/or such methods and systems may be used in combination with other detection systems. For example, in one illustrative embodiment of such a combined system according to the present invention, reflections from a scene in at least a portion of one band of the near-infrared spectrum may be detected. The presence of the head of the human body in a scene may be determined based on the detected reflection in the portion of the one band of the near-infrared spectrum, e.g., segmentation of the head from the background of a scene. Thereafter, the reflection from at least one portion of the head of the human body in at least a portion of an upper band of the near-infrared spectrum may be detected to determine the presence of an artificial material associated with the head of the human body based on such reflection.

For example, such a combination system and method may be implemented using the two camera system previously described herein. For example, the dual band near-infrared method may be used for face detection for the location of a head. Thereafter, the disguise detection method may be used to determine the presence of an artificial material.

Further, for example, in another embodiment of such a combination system and method, the head may be determined to be present by detecting the reflection from a scene in at least a portion of the upper band of the near-infrared spectrum. For example, the upper band of the near-infrared spectrum within the range of 1.4 µm to 2.2 µm may be used to determine the presence of the human head such as described previously herein, e.g., wherein a dummy head is differentiated from the human head or a human head is differentiated form a background. Further, thereafter, it may be determined whether the human head is disguised also using the upper band of the near-infrared spectrum, as previously described herein.

Such methods and systems may be used in combination with other systems and methods such as those that employ thermal infrared detection. Thermal infrared detection may be used for detecting cosmetic surgery disguises. Such cosmetic surgery disguises may not be detectable by the disguise detection process using the upper band of the near-infrared spectrum, as previously described herein. Likewise, visible spectrum systems may be used in combination with the previously described methods and systems herein so as to enhance detection capabilities.

All patents and references cited herein are incorporated in their entirety as if each were incorporated separately. Although the invention has been described with particular reference to the preferred embodiments thereof, variations and modifications of the present invention can be made within a contemplated scope of the claims, as is readily known to one skilled in the art.

What is claimed is:

1. A method for use in detection of a person disguised with one or more artificial materials, the method comprising:
   detecting reflection from at least one portion of a head of a human body in at least a portion of an upper band of the near infrared spectrum; and
   determining the presence of an artificial material associated with the head of the human body based on the detected reflection.

2. The method of claim 1, wherein the at least a portion of the upper band of the near infrared spectrum is at least a portion within the range of 1.4 µm and above in upper band of the near infrared spectrum.

3. The method of claim 2, wherein the at least a portion of the upper band of the near infrared spectrum is at least a portion within the range of 1.4 µm to 2.4 µm in the upper band of the near infrared spectrum.

4. The method of claim 3, wherein the at least a portion of the upper band of the near infrared spectrum is at least a portion within the range of 1.4 µm to 1.7 µm in the upper band of the near infrared spectrum.

5. The method of claim 1, wherein detecting reflection comprises detecting reflection from at least a skin portion of the head of the human body.

6. The method of claim 1, wherein detecting reflection comprises detecting reflection from at least a hair portion of the head of the human body.

7. The method of claim 1, wherein determining the presence of an artificial material associated with the head of the human body comprises displaying to a user a representation of the detected reflection of the at least one portion of the head of the human body.

8. The method of claim 1, wherein determining the presence of an artificial material associated with the head of the human body comprises:
generating data representative of the detected reflection; and
comparing the data to at least one threshold reference reflection level.

9. The method of claim 8, wherein generating data representative of the detected reflection comprises focusing the reflection on a pixel array that is sensitive to the at least a portion of the upper band of the near infrared spectrum, and generating a signal representative of the spectral power for each of a plurality of pixels of the pixel array to be used for the comparison to the at least one threshold reference reflection level.

10. The method of claim 8, wherein the at least one threshold reference reflection level is based on a level of reflection of the one or more artificial materials.

11. The method of claim 10, wherein the at least one threshold reference reflection level is a plurality of reference reflection levels corresponding to a plurality of artificial materials, and further wherein the method comprises identifying one or more of the artificial materials associated with the head of the human body.

12. The method of claim 8, wherein the at least one threshold reference reflection level is based on a level of reflection of natural skin of the human body.

13. The method of claim 8, wherein the at least one threshold reference reflection level is based on a level of reflection of natural hair of the human body.

14. The method of claim 1, wherein the method further comprises illuminating the at least a portion of the head of the human body using an illumination source matched to the at least a portion of the upper band of the near infrared spectrum.

15. The method of claim 14, wherein the method further comprises:
detecting an illumination level proximate the head of the human body; and
controlling the illumination source based on the detected illumination level to maintain a desired illumination level on the head of the human body.

16. A disguised person detection system comprising:
a detector apparatus operable to detect reflection from at least a portion of a head of a human body in at least a portion of an upper band of the near infrared spectrum; and
an indication apparatus operable to provide a user with information as to the presence of an artificial material associated with the head of the human body based on the detected reflection.

17. The system of claim 16, wherein the at least a portion of the upper band of the near infrared spectrum is at least a portion within the range of 1.4 µm and above in the upper band of the near infrared spectrum.

18. The system of claim 17, wherein the at least a portion of the upper band of the near infrared spectrum is at least a portion within the range of 1.4 µm to 2.4 µm in the upper band of the near infrared spectrum.

19. The system of claim 18, wherein the at least a portion of the upper band of the near infrared spectrum is at least a portion within the range of 1.4 µm to 1.7 µm in the upper band of the near infrared spectrum.

20. The system of claim 16, wherein the indication apparatus comprises a display operable to provide a representation of the detected reflection of the at least the portion of the head of the human body.

21. The system of claim 16, wherein the system further comprises a display operable to provide a representation of the detected reflection of the at least the portion of the head of the human body for use in presenting the information as to the presence of an artificial material associated with he head of the human body.

22. The system of claim 16, wherein the detector apparatus comprises one or more pixels sensitive to the at least a portion of the upper band of the near infrared spectrum and operable to provide information representative of the detected reflection from the at least the portion of the head of the human body, and further wherein the indication apparatus comprises circuitry operable to compare the information representative of the detected reflection to at least one threshold reference reflection level.

23. The system of claim 22, wherein the at least one threshold reference reflection level is based on a level of reflection of the one or more artificial materials.

24. The system of claim 23, wherein the at least one threshold reference reflection level is a plurality of reference reflection levels corresponding to a plurality of artificial materials, and further wherein the circuitry of the indication apparatus is operable for use in identifying one or more of the artificial materials associated with the head of the human body.

25. The system of claim 22, wherein the at least one threshold reference reflection level is based on a level of reflection of natural skin of the human body.

26. The system of claim 22, wherein the at least one threshold reference reflection level is based on a level of reflection of natural hair of the human body.

27. The system of claim 16, wherein the system further comprises an illumination source matched to the at least a portion of the upper band of the near infrared spectrum positioned to illuminate the at least the portion of the head of the human body.

28. The system of claim 27, wherein the system further comprises a detector operable to detect an illumination level proximate the head of the human body, and further wherein the indication apparatus comprises circuitry operable to control the illumination source based on the detected illumination level to maintain a desired illumination level of the head of the human body.

29. A detection method comprising:
detecting reflection from a scene in at least a portion of one band of the near infrared spectrum;
determining the presence of a head of a human body in the scene based on the detected reflection in the at least a portion of the one band of the near infrared spectrum;
detecting reflection from at least one portion of the head of the human body in at least a portion of an upper band of the near infrared spectrum to determine the presence of an artificial material associated with the head of the human body based on the detected reflection from at least one portion of the head of the human body.

30. The method of claim 29, wherein detecting reflection from a scene in at least a portion of one band of the near infrared spectrum comprises detecting reflection from the scene in at least a portion of a lower band of the near infrared spectrum and from the scene in at least a portion of an upper band of the near infrared spectrum.

31. The method of claim 30, wherein the at least a portion of the lower band of the near infrared spectrum is at least a portion within the range of 0.8 µm to 1.4 µm in the lower band of the near infrared spectrum, and further wherein the at least a portion of the upper band of the near infrared spectrum is at least a portion within the range of 1.4 µm to 2.2 µm in the upper band of the near infrared spectrum.

32. The method of claim 29, wherein detecting reflection from a scene in at least a portion of one band of the near infrared spectrum comprises detecting reflection from the scene in at least a portion of the upper band of the near infrared spectrum.

33. The method of claim 32, wherein the at least a portion of the upper band of the near infrared spectrum is at least a portion within the range of 1.4 µm to 2.2 µm in the upper band of the near infrared spectrum.

34. The method of claim 29, wherein detecting reflection from at least one portion of a head of a human body in at least a portion of an upper band of the near infrared spectrum comprises detecting reflection from at least one portion of a head of a human body in at least a portion within the range of 1.4 µm to 2.2 µm in the upper band of the near infrared spectrum.

35. The method of claim 34, wherein to determine the presence of an artificial material associated with the head of the human body a representation of the detected reflection of the at least one portion of the head of the human body is displayed to a user.

36. The method of claim 29, wherein detecting reflection from at least one portion of a head of a human body comprises detecting reflection from at least a skin portion of the head of the human body.

37. The method of claim 29, wherein detecting reflection from at least one portion of a head of a human body comprises detecting reflection from at least a hair portion of the head of the human body.

* * * * *